United States Patent
Vintzel et al.

(10) Patent No.: US 10,447,814 B2
(45) Date of Patent: Oct. 15, 2019

(54) JOINT SERVICING OF SOFTWARE PACKAGES

(71) Applicant: Microsoft Technology Licensing, LLC, Redmond, WA (US)

(72) Inventors: John J. Vintzel, Redmond, WA (US); Jason G. Salameh, Bothell, WA (US); Sandeep P. George, Issaquah, WA (US); Sarjana S. Mitra, Yarrow Point, WA (US); Carl W. Russell, Snoqualmie, WA (US); John M. Sheehan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 213 days.

(21) Appl. No.: 15/423,327

(22) Filed: Feb. 2, 2017

(65) Prior Publication Data

US 2018/0219972 A1 Aug. 2, 2018

(51) Int. Cl.
*H04L 12/00* (2006.01)
*H04L 29/08* (2006.01)
(Continued)

(52) U.S. Cl.
CPC .............. *H04L 67/34* (2013.01); *G06F 8/61* (2013.01); *G06F 8/65* (2013.01); *G06F 8/656* (2018.02);
(Continued)

(58) Field of Classification Search
CPC ..... G06F 8/60; G06F 8/61; G06F 8/65; G06F 8/71; G06F 8/20; G06F 8/658
(Continued)

(56) References Cited

U.S. PATENT DOCUMENTS 5,617,533 A * 4/1997 Wu .......................... G06F 8/60
714/25
5,931,909 A * 8/1999 Taylor ..................... G06F 8/61
709/221

(Continued)

OTHER PUBLICATIONS

"9 Creating Shared Java EE Libraries and Optional Packages", http://web.archive.org/web/20111204065650/http:/docs.oracle.com/cd/E21764_01/web.1111/e13706/libraries.htm, Published on: Dec. 4, 2011, 12 pages.

(Continued)

*Primary Examiner* — Frantz Coby
(74) *Attorney, Agent, or Firm* — Fiala & Weaver P.L.L.C.

(57) ABSTRACT

Methods, systems, and apparatuses for publishing, acquiring, and servicing of related software packages together. Flexible yet robust software package version control through joint servicing using atomic sets, including business software applications and consumer software applications, is performed by client and developer devices in conjunction with a host server. Developers and publishers develop and provide applications and assign specific, related versions of software packages, that are jointly operable per atomic sets embodied in atomic set manifests, in software program bundles for acquisition by end users. Adherence to jointly serviced software packages using atomic sets is performed by client devices and/or servers in a manner that is transparent to the end user. The end user is enabled to acquire all or less than all software packages that make up an atomic set, yet each software package acquired adheres to the version requirements set forth by the atomic set.

20 Claims, 11 Drawing Sheets

(51) Int. Cl.
*G06F 8/61* (2018.01)
*H04L 29/06* (2006.01)
*G06F 8/656* (2018.01)
*G06F 8/71* (2018.01)
*G06F 8/65* (2018.01)

(52) U.S. Cl.
CPC ............... *G06F 8/71* (2013.01); *H04L 67/02* (2013.01); *H04L 67/125* (2013.01); *H04L 67/42* (2013.01)

(58) Field of Classification Search
USPC .... 717/110, 169–173, 175, 120, 10; 714/25, 714/38.1; 711/103; 709/221, 219, 225
See application file for complete search history.

(56) References Cited

U.S. PATENT DOCUMENTS

| | | | | |
|---|---|---|---|---|
| 6,123,373 | A * | 9/2000 | Yoshida | E05C 3/06 292/197 |
| 6,370,681 | B1 * | 4/2002 | Dellarocas | G06F 8/20 717/110 |
| 6,385,766 | B1 * | 5/2002 | Doran, Jr. | G06F 8/63 707/999.202 |
| 6,539,539 | B1 * | 3/2003 | Larsen | G06F 8/61 379/9.01 |
| 6,675,382 | B1 * | 1/2004 | Foster | G06F 8/61 707/999.001 |
| 6,711,557 | B1 | 3/2004 | Palaniappan | |
| 7,051,157 | B2 * | 5/2006 | James | G06F 9/44573 711/103 |
| 7,222,341 | B2 * | 5/2007 | Forbes | G06F 8/61 717/169 |
| 7,461,374 | B1 * | 12/2008 | Balint | G06F 8/658 717/174 |
| 7,506,335 | B1 * | 3/2009 | Wooff | G06F 8/61 717/173 |
| 7,823,146 | B2 | 10/2010 | Surace | |
| 7,966,612 | B2 * | 6/2011 | D'Alterio | G06F 8/61 717/168 |
| 8,316,364 | B2 * | 11/2012 | Stein | G06F 8/65 717/172 |
| 8,621,454 | B2 * | 12/2013 | Wookey | G06F 8/658 717/175 |
| 8,924,569 | B2 * | 12/2014 | Li | G06F 9/5055 709/227 |
| 2002/0188941 | A1 * | 12/2002 | Cicciarelli | G06F 8/60 717/175 |
| 2004/0003390 | A1 | 1/2004 | Canter et al. | |
| 2004/0010786 | A1 | 1/2004 | Cool et al. | |
| 2007/0033201 | A1 * | 2/2007 | Stienhans | G06F 8/71 |
| 2007/0101197 | A1 * | 5/2007 | Moore | G06F 8/61 714/38.1 |
| 2007/0168956 | A1 * | 7/2007 | Moore | G06F 8/60 717/120 |
| 2007/0271552 | A1 * | 11/2007 | Pulley | G06F 9/453 717/120 |
| 2011/0214114 | A1 * | 9/2011 | Vidal | G06F 8/71 717/170 |
| 2011/0289499 | A1 | 11/2011 | Haubold et al. | |
| 2011/0296398 | A1 * | 12/2011 | Vidal | G06F 8/65 717/171 |
| 2012/0144378 | A1 * | 6/2012 | Shah | G06F 8/60 717/170 |
| 2014/0325502 | A1 | 10/2014 | Zarifis et al. | |
| 2014/0359596 | A1 | 12/2014 | Cohen et al. | |

OTHER PUBLICATIONS

Modess, Niklas, "Atomic deploy for PHP applications", https://modess.io/atomic-deploy-for-php-applications/, Published on: Jan. 29, 2015, 7 pages.

"Chapter 3: Component Sharing", http://web.archive.org/web/20081201151136/http://msdn.microsoft.com/en-us/library/ms995843.aspx, Published on: Dec. 1, 2008, 6 pages.

Stewart, Heath, "Installation sequence restrictions for multi-package transactions", https://blogs.msdn.microsoft.com/heaths/2009/07/03/installation-sequence-restrictions-for-multi-package-transactions/, Published on: Jul. 3, 2009, 6 pages.

Prins, et al., "Nix fixes dependency hell on all Linux distributions", https://www.linux.com/news/nix-fixes-dependency-hell-all-linux-distributions, Published on: Dec. 22, 2008, 8 pages.

"Chapter 2 Upgrading Shared Components", https://docs.oracle.com/cd/E19396-01/819-0062/upshared.html%5d, Published on: 2005, 19 pages.

"Chapter 2. Install/Uninstall", http://web.archive.org/web/20080917001116/http://msdn.microsoft.com/en-us/library/ms954376.aspx, Published on: Sep. 17, 2008, 4 pages.

* cited by examiner

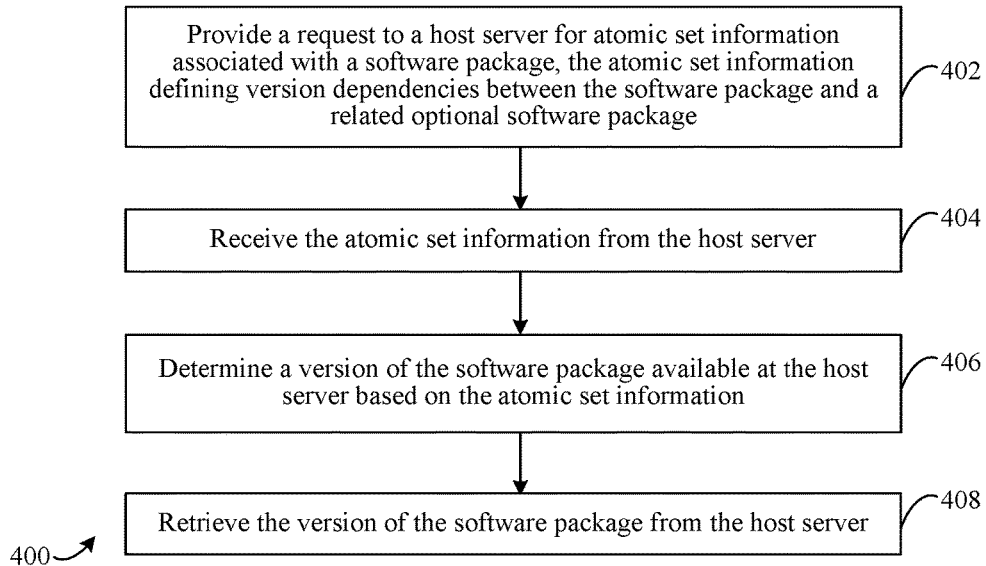

FIG. 4

```
<?xml version="1.0" encoding="UTF-8" standalone="yes/no"?>

<Bundles Version="1.1.0.0">

<Bundle Version="2.0" xmlns="http://schemas.publisher.com/dir/
bundle" >
     <Identity Name="publisher.Main" Publisher="CN=Publisher,
L=Location, S=State, C=Country" Version="1.0.0.1"/>
  </Bundle>

<Bundle Version="2.0" xmlns="http://schemas.publisher.com/dir/
bundle" >
     <Identity Name="publisher.Main.Optional_1"
Publisher="CN=Publisher, L=Location, S=State, C=Country"
Version="1.0.0.1"/>
  </Bundle>

<Bundle Version="2.0" xmlns="http://schemas.publisher.com/dir/
bundle" >
     <Identity Name="publisher.Main.Optional_2"
Publisher="CN=Publisher, L=Location, S=State, C=Country"
Version="1.0.0.0"/>
  </Bundle>

<Bundle Version="2.0" xmlns="http://schemas.publisher.com/dir/
bundle" >
     <Identity Name="publisher.Main.Optional_3"
Publisher="CN=Publisher, L=Location, S=State, C=Country"
Version="1.0.0.2"/>
  </Bundle>

...

</Bundles>
```

JOINT SERVICING OF SOFTWARE PACKAGES

BACKGROUND

Software developers and publishers create and provide software for end users including individuals, students, businesses, etc. This software may be updated over time using updates from the developers and publishers. Additionally, a main software program may have related sub-components or optional components such as programs, data, resources and resource files, etc., that may be acquired and installed with, or at separate times from, the main software program. These related sub-components may also be updated over time using updates from the developers and publishers.

An end user may wish to acquire or update some or all of the related sub-components of the main program and/or may wish to acquire the main program or acquire updates to the main program at various points in time. In some cases, specific versions of the main program may properly operate only with specific versions of related applications or sub-components. If these specific versions are not kept synchronized at the device of the end user, abnormal program behaviors may occur.

SUMMARY

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

Methods, systems, and apparatuses for creating, publishing, acquiring, and servicing of related software packages together are described. For example, methods may be performed in client devices for providing requests to a host server for atomic set information associated with a software package, where atomic set information defines version dependencies between the components of the software package, such as a main software program, and related optional software packages. The atomic set information is received from the host server, and a version of the software package available at the host server is determined based on the atomic set information. The version of the software package is retrieved from the host server and may be installed at the client device. The versions of the related optional software packages may also be retrieved and installed. During subsequent installations and updates (e.g., servicing), specific versions of the software package and the related optional software packages are used according to the atomic set information for joint software package servicing.

In another example, a developer system is described in which a UI configured to receive a set of program components from an application developer entity is provided to a developer. The set of program components includes a main software package and/or an optional software package, and each software package in the set of program components has a version value which may be determined. An atomic set manifest is generated based on the version values, and a software program bundle that includes the set of program components and the atomic set manifest is then generated. The software program bundle may then be provided to a host server for distribution, e.g., via an online store or update service, where the atomic set manifest determines versions of software packages in the software bundle that are configured to operate together or jointly.

These and other objects, advantages and features will become readily apparent in view of the following detailed description of examples of the invention. Note that the Brief Summary and Abstract sections may set forth one or more, but not all examples contemplated by the inventor(s). Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate examples of the present application and, together with the description, further serve to explain the principles of the examples and to enable a person skilled in the pertinent art to make and use the examples.

FIG. 4 shows a flowchart of a process for atomic set software package deployment, according to an example.

FIG. 5 shows an example atomic set manifest, according to an example.

Figure 1:
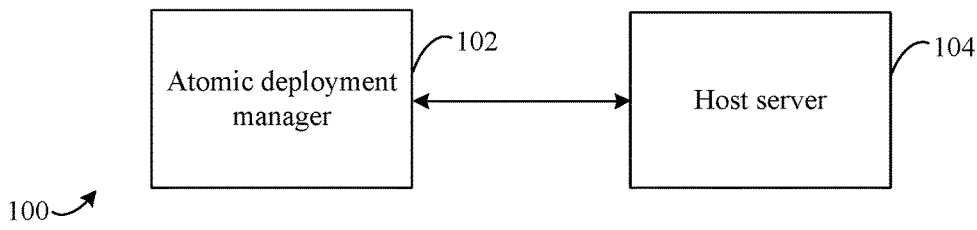
FIG. 1 shows a block diagram of an atomic set deployment system, according to an example.

The features and advantages of the examples described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous examples. The scope of the present patent application is not limited to the disclosed examples, but also encompasses combinations of the disclosed examples, as well as modifications to the disclosed examples.

References in the specification to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to effect such feature, structure, or characteristic in connection with other examples whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous examples are described as follows. It is noted that any section/subsection headings provided herein are not intended to be limiting. Examples are described throughout this document, and any type of example may be included under any section/subsection. Furthermore, examples disclosed in any section/subsection may be combined with any other examples described in the same section/subsection and/or a different section/subsection in any manner.

Section II below describes examples for development of workflows. In particular, sub-sections A, B, and C of Section II describe example system level, client level, and developer level examples, respectively.

Section III below describes an example mobile device that may be used to implement features of the examples described herein. Section IV below describes an example processor-based computer system that may be used to implement features of the example described herein. Section V below describes some examples. Section VI provides some concluding remarks.

II. Examples

The examples described herein are provided for illustrative purposes, and are not limiting. The examples described herein may be adapted to any type of electronic and/or processing device, as well as systems thereof. Further structural and operational examples, including modifications/alterations, will become apparent to persons skilled in the relevant art(s) from the teachings herein.

When software developers and publishers create and provide software for end users, the control of newly installed and updated versions of software packages by an end user may be enforced by each and every optional software package being provided with a main software package at each download or update.

An end user may wish to acquire or update less than all of the related sub-components of the main program and/or may wish to acquire or update the main program at various points in time. However, the end user may experience operational issues with software if incompatible versions of software packages are installed because specific versions of the main program may properly operate only with specific versions of related sub-components. For instance, a user may wish to acquire downloadable content (DLC) for a gaming application, additional, optional, and/or add-on components for productivity software, etc. at different times, and issues may arise due to incompatibilities or unsupported features between versions of installed software applications and newly-acquired components.

Examples described herein enable flexible yet robust software package version control through joint servicing using atomic sets, including business software applications and consumer software applications. Developers and publishers are enabled to develop applications and assign specific, related versions of software packages, that are jointly operable per atomic sets embodied in atomic set manifests, in software program bundles for acquisition by end users. Adherence to jointly serviced software packages as described herein using atomic sets may be performed by client devices and/or servers in a manner that is transparent to the end user. The end user is enabled to acquire all or less than all software packages that make up an atomic set, yet each software package acquired adheres to the version requirements set forth by the atomic set.

Examples are described in the following subsections for joint software package servicing and development. In the following description, a person that develops an application or software package using the techniques described herein may be referred to as a "developer," and a person that uses the application at runtime may be referred to as a "user" or "end user". However, it is to be understood that the developer may also be considered a "user" of the software package version control through joint servicing. A "developer entity" as referred to herein comprises one or more developers associated by agreement or employment, such as by working for the same business entity. Additionally, a device of an "end user" may be referred to as an "end user client," a "client system," a "client device," and/or the like, and a device of a "developer" may be referred to as a "developer client," a "developer system," a "developer device," and/or the like, herein. Furthermore, person(s) or a business entity(ies) that distributes or makes available software packages and/or software program bundles using the techniques described herein may be referred to as a "publisher," and it is contemplated that "publishers" may be "developers."

A. Joint Servicing Systems Example

Joint software package servicing systems and devices may be enabled in various ways according to examples. For example, FIG. 1 is a block diagram of an atomic set deployment system 100, according to an example. As shown in FIG. 1, atomic set deployment system 100 includes an atomic deployment manager 102 and a host server 104.

Host server 104 may comprise one or more servers and may be distributed or "cloud-based" servers. Host server 104 may store software applications packaged as software program bundles (or software bundles) of one or more software packages to be available for acquisition by end users. The software program bundles may also comprise an atomic set manifest associated with the software packages.

Atomic deployment manager 102 and host server 104 are configured to be communicatively coupled via any type of connection(s) that connects computing devices such as, but not limited to, the Internet, wired or wireless networks and portions thereof, point-to-point connections, and/or the like.

Atomic deployment manager 102 is configured to perform and/or facilitate joint servicing of software packages. Atomic deployment manager 102 may reside in an end user (client) system/device or a developer system/device which may be any type computing device, including a mobile computing device (e.g., a smart phone, a Microsoft® Surface® device, a laptop computer, a notebook computer, a tablet computer such as an Apple iPad™, a netbook, etc.), or a stationary computing device such as a desktop computer or PC (personal computer). In examples, atomic deployment manager 102 may reside in system or device as a stand-alone application or as part of another application, such as but without limitation, as part of a main software package of a software application, as a separate part of the software application, and/or the like.

Atomic deployment manager 102 is configured to jointly service software packages according to atomic sets as designated by developers of the software packages.

Figure 2:
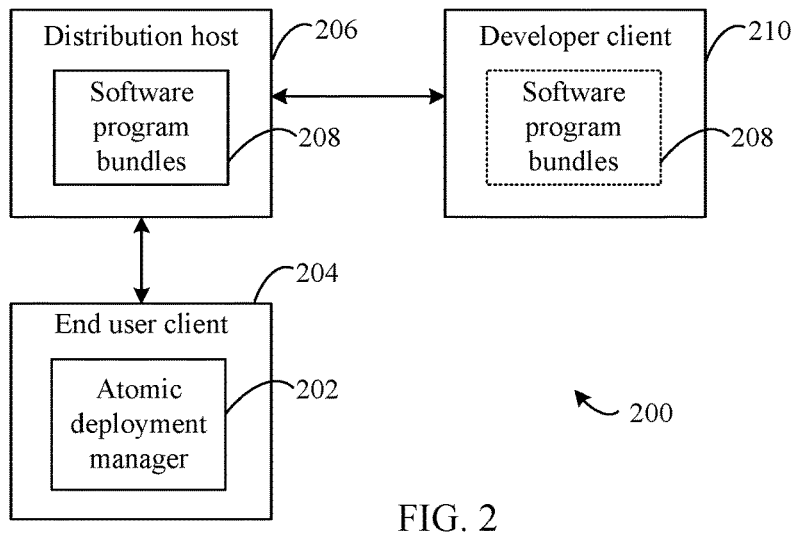
FIG. 2 shows a block diagram of an atomic set deployment system, according to an example.

For instance, FIG. 2 is a block diagram of an atomic set deployment system 200, according to an example. As shown in FIG. 2, atomic set deployment system 200 includes an atomic deployment manager 202 residing at an end user client 204, a distribution host 206, and a developer client 210. Atomic deployment manager 202 may be an example of atomic deployment manager 102 of FIG. 1, and distribution host 206 may be an example of host server 104 of FIG. 1.

Developer client 210 may be a developer system/device (that may also be an end user (client) system/device) which may comprise any type computing device, including a mobile computing device (e.g., a smart phone, a Microsoft® Surface® device, a laptop computer, a notebook computer, a tablet computer such as an Apple iPad™, a netbook, etc.), or a stationary computing device such as a desktop computer or PC (personal computer). Developer client 210 is configured to enable a developer to generate software program bundles 208 as described herein. The generated software program bundles 208 may include one or more software packages developed by the developer using developer client 210 and/or one or more software packages developed by another developer using another developer client (not shown). Software program bundles 208 may also comprise an atomic set manifest that includes atomic set information associated with the software packages as designated by the developer(s). A developer via developer client 210 may provide software program bundles 208 to the distribution host for publishing and distribution to end users that desire one or more software packages of software program bundles 208. Developer client 210 is described in further detail below.

End user client 204, distribution host 206, and developer client 210 are configured to be communicatively coupled via any type of connection(s) that connect computing devices such as, but not limited to, the Internet, wired or wireless networks and portions thereof, point-to-point connections, and/or the like.

Distribution host 206 may be a server(s) and may host an online software application store, a software update repository, and/or the like, in which software packages, such as software program bundles 208, are available for acquisition by end users from developers.

Atomic deployment manager 202 residing at end user client 204 is configured to request an atomic set manifest or information therefrom (i.e., atomic set information) for a software package from distribution host 206. For example, the atomic set manifest or information therefrom may be included in or associated with a software program bundle such as one of software program bundles 208. In examples, atomic deployment manager 202 is configured to determine the versions of the software package, and of other related software packages, from the atomic set information. In examples, atomic deployment manager 202 is configured to retrieve the determined versions of the software packages for storage and/or installation as main software applications and related optional software applications.

B. Joint Servicing Client Examples

Figure 3:
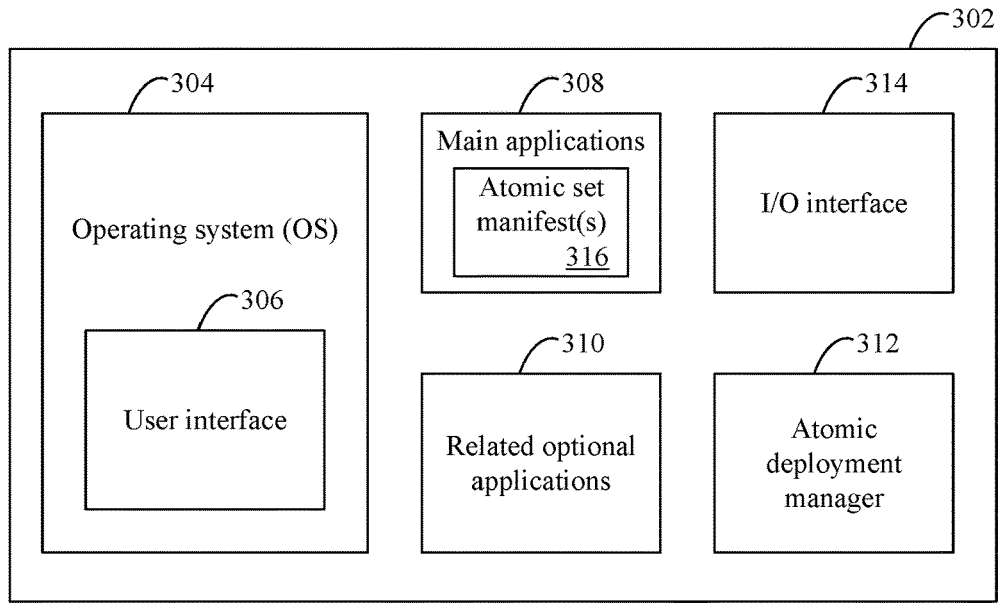
FIG. 3 shows a block diagram of a client system, according to an example.

FIG. 3 is a block diagram of a client system 300, according to an example. Client system 300 may be a further example of end user client 204 of FIG. 2. As shown in FIG. 3, client system 300 includes a client device 302 (i.e., an end user client) that comprises a plurality of components. Client device 302 may be any type computing device, as mentioned elsewhere herein or otherwise known. As shown in FIG. 3, client device 302 includes an operating system (OS) 304 with a user interface (UI) 306, one or more main applications 308, related optional applications 310, an atomic deployment manager 312 that is an example of atomic deployment manager 202 of FIG. 2, and an input/output (I/O) interface 314. Client system 300 may also include additional components (not shown for brevity and illustrative clarity) such as, but not limited to, those described below with respect to FIGS. 23 and 24.

I/O interface 314 may be any type of network adapter, modem, etc., configured to allow client device 302 to communicate with other devices over a network, e.g., such as distribution host 206 described above with respect to FIG. 2. OS 304 may be any operating system used by computing devices described herein such as, but without limitation, Microsoft® Windows® from Microsoft Corporation of Redmond, Wash., OS X® from Apple, Inc. of Cupertino, Calif., UNIX® from The Open Group, and/or the like, and UI 306 provides a UI for OS 304. In examples, OS 304 may be accessed via a network connection to a server (not shown) where client device 302 operates as a workstation or terminal.

Client devices and systems for joint servicing of software packages such as client system 300 and client device 302 of FIG. 3 may be enabled in various ways according to examples. For example, FIG. 4 shows a flowchart 400 of a process for atomic set software package deployment, according to an example. For purposes of illustration, flowchart 400 of FIG. 4 is described with respect to client system 300 of FIG. 3 and also with reference to FIG. 2. That is, end user client 204 of FIG. 2 and/or client system 300 of FIG. 3 may perform their respective functions and operations in accordance with flowchart 400. Further structural and operational examples will be apparent to persons skilled in the relevant art(s) based on the following description. Flowchart 400 is described as follows.

In step 402, a request is provided to a host server for atomic set information associated with a software package, the atomic set information defining version dependencies between the software package and a related optional software package. For example, an atomic set information request may be provided to a host server such as distribution host 206 of FIG. 2 from atomic deployment manager 312 of client device 302 via I/O interface 314. Atomic deployment manager 312 may be a part of OS 304, a part of one or more of main applications 308 (e.g., where multiple instances of atomic deployment manager 312 may be present for different software applications), or may be a separate component of client system 300. That is, for illustrative clarity, atomic deployment manager 312 is shown as a separate component, but this example is not to be considered limiting.

In examples, an instruction may be received by atomic deployment manager 312 to provide the atomic set information request. The instruction may be generated by an end user via one of main applications 308 installed at client device 302 and/or UI 306 where the end user desires to update one of main applications 308 and/or a number of related optional applications 310. Alternatively, the instruction may be received from distribution host 206 to notify client device 302 that an update for the one of main applications 308 and/or a number of related optional applications 310. In some examples, the instruction may be provided responsive to the execution of an installation script by a deployment engine of OS 304 at client device 302 or another device associated with client device 302 where it is desired to newly install an additional one of main applications 308 at client device 302.

As an example scenario, an end user may desire to newly install or update their application for Microsoft® Office® from Microsoft Corporation, although any example application may be considered in this scenario such as iWork® from Apple, Inc., Adobe® Creative Suite® from Adobe Systems Incorporated of San Jose, Calif., etc. The user may provide an instruction to install or update, which prompts a request for atomic set information associated with the main software package of the Microsoft® Office® application to be provided to distribution host 206 from atomic deployment manager 312 at client device 302.

In step 404, the atomic set information is received from the host server. For instance, atomic set information of an atomic set manifest in a software program bundle of software program bundles 208 of FIG. 2 may be provided from distribution host 206 to client device 302 where it is received via I/O interface 314. The atomic set information may be received by atomic deployment manager 312. The atomic set information may be stored in a memory of client device 302 for use in the steps of flowchart 400. In examples, the entire atomic set manifest may be received.

Continuing with the above example scenario, atomic set information associated with the main software package of the Microsoft® Office® application is received by atomic deployment manager 312, which may be a component of the main Microsoft® Office® application (of main applications 308) that is executing on client device 302.

In step 406, a version of the software package available at the host server is determined based on the atomic set information. For instance, atomic deployment manager 312 may parse the atomic set information received in step 404 to determine the atomic set versions of the main software package and any related optional applications in the software program bundle of software program bundles 208 available at distribution host 206 of FIG. 2.

Atomic set information may be formatted/configured in any suitable manner. For instance, FIG. 5 shows an example atomic set manifest 500, according to an example. Atomic set manifest 500 is an example of the atomic set manifests of software program bundles 208 of FIG. 2, and/or of atomic set manifest(s) 316. As exemplarily illustrated using pseudo-XML, atomic set manifest 500 defines version dependencies between the software package and related optional software packages. Atomic set manifest 500 may include an initiating tag with a software program bundling version value (e.g., "1.1.0.0," as illustrated) that corresponds to a closing tag to denote the beginning and end of the atomic set information in atomic set manifest 500. The software program bundling version value may denote the current version of the bundling process that is being used, as described in further detail below. Within atomic set manifest 500, there may be one or more bundle tag sets corresponding to software packages in the software program bundle (such as one of software program bundles 208 in FIG. 2). As shown, a tag set for a main software package and tag sets for three related optional software packages are included, although fewer, additional, and/or alternative tag sets for software packages are also contemplated herein.

Each tag set may include a software package bundle version value that denotes the bundle version for the software package bundle itself, and a path or directory location for the software package bundle. Each tag set may also include the name of the corresponding software package, e.g., "Main," "Optional_1," etc., along with corresponding developer information. Each tag set may further include a version value for the corresponding software package of the atomic set. As illustrated, the Main software package has a version value of "1.0.0.1," the Optional_1 software package has a version value of "1.0.0.1," the Optional_2 software package has a version value of "1.0.0.0," and the Optional_3 software package has a version value of "1.0.0.2." In examples, the version values for the corresponding software packages of the atomic set are used by atomic deployment manager 312 to ensure that no other versions of these software packages may be installed for joint operation with each other.

Turning back to flowchart 400 of FIG. 4, and continuing with the example scenario in steps 402 and 404, atomic deployment manager 312 parses the atomic set information, e.g., as described above with respect to atomic set manifest 500 of FIG. 5. Furthermore, a version of the software package, e.g., for the main Microsoft® Office® software package (available at the host server), is determined based on the atomic set information. The versions of the related optional software packages described in the atomic set information may also be determined and stored for subsequent use. In this scenario, the related optional software packages may correspond to Microsoft® Word, Microsoft®

PowerPoint®, Microsoft® Excel®, etc., from Microsoft Corporation (although as noted herein the related optional software packages may correspond to other main software packages such as Apple® Pages®, Apple® Keynote®, Apple® Numbers®, etc., of Apple® iWork® from Apple, Inc., or other software packages).

In step 408, the version of the software package is retrieved from the host server. For instance, atomic deployment manager 312 is configured to retrieve the version of the software package (in the form of program code) from the software program bundle that is specified in the atomic set information determined in step 406. Once retrieved, the software package may be stored for installation by client device 302 to be a main application of main applications 308. Additionally, the atomic set manifest in the software program bundle from which the atomic set information was received in step 404 may be stored as an atomic set manifest of atomic set manifest(s) 316 and associated with the software package when installed.

With respect to the example scenario (described with respect to steps 402, 404, and 406 above), the main software package for Microsoft® Office® and its associated atomic set manifest are retrieved and stored by atomic deployment manager 312 at client device 302.

Figure 6:
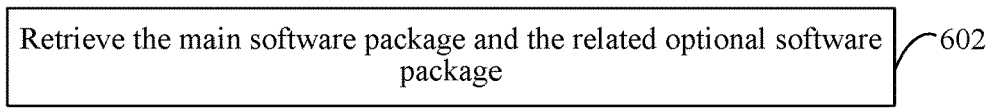
FIG. 6 shows a flowchart of a process for retrieval of related software packages of an atomic set, according to an example.

It is also contemplated herein that versions of one or more related optional software packages may be retrieved with the software package, or not retrieved with the software package, as described herein. For instance, FIG. 6 shows a flowchart 600 of a process for atomic set software package deployment, according to an example. Flowchart 600 may be a further example of flowchart 400 of FIG. 4 (e.g., step 408). For purposes of illustration, flowchart 600 of FIG. 6 is described with respect to client system 300 of FIG. 3 and also with reference to FIG. 2. That is, end user client 204 of FIG. 2 and/or client system 300 of FIG. 3 may perform their respective functions and operations in accordance with flowchart 600. Further structural and operational examples will be apparent to persons skilled in the relevant art(s) based on the following description. Flowchart 600 is described as follows.

In step 602, the main software package and the related optional software package are retrieved. For instance, atomic deployment manager 312 is configured to retrieve the version of the software package and the version of a related optional software package from the software program bundle specified in the atomic set information determined in step 406 (from distribution host 206 of FIG. 2 via I/O interface 314). As noted above in flowchart 400, the versions of related optional software packages of a software program bundle may also be received in atomic set information from a host server, e.g., distribution host 206 of FIG. 2, Once retrieved, the software package and the related optional software package may be stored for subsequent installation by client device 302 to respectively be a main application of main applications 308 and a related optional application of related optional applications 310. Additionally, the atomic set manifest in the software program bundle from which the atomic set information was received in step 404 may be stored as an atomic set manifest of atomic set manifest(s) 316 and associated with the software package and the related optional software package when installed.

With respect to the example scenario described above with respect to flowchart 400 of FIG. 4, the version of main software package for Microsoft® Office® and its associated atomic set manifest, as well as a version of a related optional software package such as Microsoft® Word, Microsoft® PowerPoint®, or Microsoft® Excel®, etc., from Microsoft Corporation are retrieved and stored by atomic deployment manager 312 at client device 302. It is also contemplated in examples that related optional software packages may comprise media or multimedia content, library files such as dynamic linked library (DLL) files, other resources, add-on program applications, and/or the like, and that related optional software packages may be from a variety of developers or developer entities.

Figure 7:
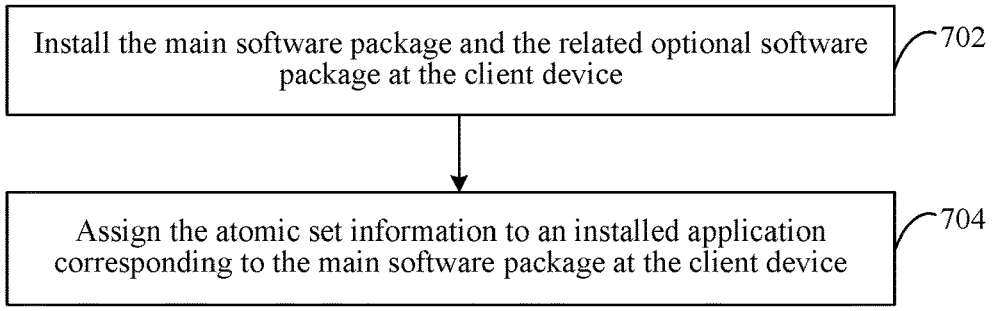
FIG. 7 shows a flowchart of a process for installation of retrieved related software packages of an atomic set, according to an example.

As noted above, retrieved software packages may be installed at a client device, e.g., client device 302 of FIG. 3. For instance, FIG. 7 shows a flowchart 700 of a process for atomic set software package deployment, according to an example. Flowchart 700 may be a further example of flowchart 400 of FIG. 4 and/or flowchart 600 of FIG. 6. For purposes of illustration, flowchart 700 of FIG. 7 is described with respect to client system 300 of FIG. 3 and also with reference to FIG. 2. That is, end user client 204 of FIG. 2 and/or client system 300 of FIG. 3 may perform their respective functions and operations in accordance with flowchart 700. Further structural and operational examples will be apparent to persons skilled in the relevant art(s) based on the following description. Flowchart 700 is described as follows.

In step 702, the main software package and the related optional software package are installed at the client device. For instance, once retrieved as in step 408 of flowchart 400 and/or in step 602 of flowchart 600, the software package and/or the related optional software package may be stored and installed by client device 302 to respectively be a main application of main applications 308 and a related optional application of related optional applications 310. Upon receipt of the software package and/or the related optional software package, installation may begin automatically by client device 302, e.g., initiated by atomic deployment manager 312, or may begin based on an input of the end user via UI 306 or a UI of an application executing on client device 302.

In step 704, the atomic set information is assigned to an installed application corresponding to the main software package at the client device. For example, the atomic set manifest in the software program bundle from which the atomic set information was received in step 404 may be assigned as the atomic set manifest (e.g., of atomic set manifest(s) 316) to the installed application corresponding to the software package and/or the related optional software package. When the installed applications have a corresponding atomic set in the atomic set manifest, future downloads for other software packages, e.g., related optional software packages that have not yet been installed at client device 302, are performed to adhere to the version values for such yet-to-be-installed related optional software packages according to the atomic set information.

With respect to the example scenario in the steps of flowchart 400 of FIG. 4 above, the version of the software package for Microsoft® Office® and a corresponding version of a related optional software package (such as Microsoft® Word, Microsoft® PowerPoint®, or Microsoft® Excel®, etc., from Microsoft Corporation) in the atomic set manifest, are installed as applications (e.g., main applications 308 and related optional applications 310) at client device 302. The atomic set manifest from the software program bundle associated with the software package is stored at client device 302 and is assigned to the newly-installed applications.

For example, using atomic set manifest 500 of FIG. 5 to further this illustrative example scenario, the Microsoft® Office® main application would correspond to the "Main" in atomic set manifest 500 and would have a version value of "1.0.0.1," and letting the related optional application installed be Microsoft® PowerPoint®, it may correspond to any of the "Optional_*" tag sets of atomic set manifest 500, such as "Optional_3" in which case a version value of "1.0.0.2" would be associated.

Figure 8:
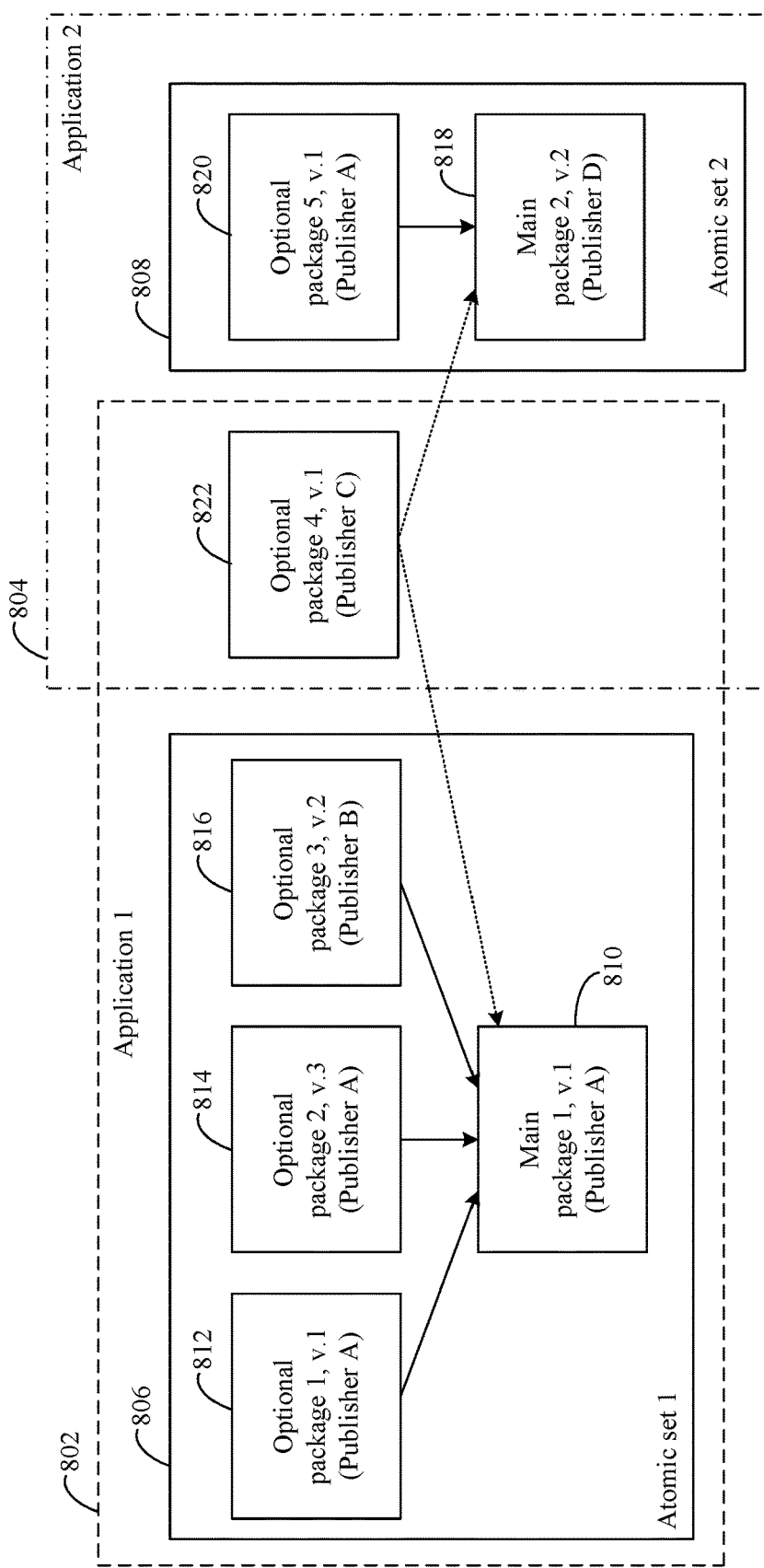
FIG. 8 shows a block diagram of a system that includes software applications and atomic sets, according to an example.

Referring now to FIG. 8, a block diagram of software applications and atomic sets in a system 800 is shown, according to an example. System 800 may be a further example of client system 300 of FIG. 3. As illustrated, system 800 includes a first application 802 and a second application 804. First application 802 and second application 804 may be retrieved and installed according to flowcharts 400, 600, 700, and/or 800, in examples. System 800 of FIG. 8 shows first application 802 and second application 804 post-installation.

First application 802 has been assigned a first atomic set 806, and second application 804 has been assigned a second atomic set 808, e.g., as described in step 704 of flowchart 700 above. The illustrated arrows designate dependencies for the software packages of the atomic sets (i.e., arrows start at dependent packages and point to packages from which the dependent packages depend). First atomic set 806 includes a first main package 810, a first optional package 812, and a second optional package 814, each from "Publisher A," as well as a third optional package 816 from "Publisher B." Second atomic set 808 includes a second main package 818 from "Publisher D," and a fifth optional package 820 from "Publisher A." It should be noted that while the publisher is denoted in FIG. 8, in examples the illustrated software packages may also have different developers or developer entities.

Also included in system 800 is a fourth optional package 822 from "Publisher C." Fourth optional package 822 is not a part of first atomic set 806 or of second atomic set 808. However, fourth optional package 822 may be utilized by first application 802 or by second application 804, in examples. For instance, fourth optional package 822 may be a software package comprising media or multimedia content, library files such as dynamic linked library (DLL) files, other resources, add-on program packages, and/or the like.

It should be noted that while first atomic set 806 and second atomic set 808 denote packages in atomic sets for first application 802 and second application 804, respectively, the optional packages of the atomic sets are not required to be installed in system 800. For example, as noted above, it is contemplated herein that versions of one or more related optional software packages may not be retrieved with the software package for installation thereof.

Figure 9:
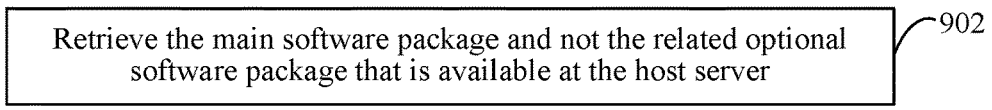
FIG. 9 shows a flowchart of a process for retrieval of a main software package but not a related package of an atomic set, according to an example.

Referring also to FIG. 9, a flowchart 900 of a process for atomic set software package deployment is shown, according to an example. Flowchart 900 may be a further example of flowchart 400 of FIG. 4, flowchart 600 of FIG. 6, and/or flowchart 700 of FIG. 7. For purposes of illustration, flowchart 900 of FIG. 9 is described with respect to client system 300 of FIG. 3 and system 800 of FIG. 8, and also with reference to FIG. 2. That is, end user client 204 of FIG. 2, client system 300 of FIG. 3, and/or system 800 of FIG. 8 may perform their respective functions and operations in accordance with flowchart 900. Further structural and operational examples will be apparent to persons skilled in the relevant art(s) based on the following description. Flowchart 900 is described as follows.

In step 902, the main software package is retrieved, and the related optional software package that is available at the host server is not retrieved. For example, as noted above in the description of step 408 of flowchart 400 of FIG. 4, the version of the software package (e.g., the main software package) is retrieved from the host server by atomic deployment manager 312 from a software program bundle that is specified in the atomic set information determined in step 406 of flowchart 400 of FIG. 4 from distribution host 206 of FIG. 2. In examples, even though other related optional software packages may be specified in the atomic set manifest associated with the software package at distribution host 206 of FIG. 2, it is not required that all or any of the related optional software packages in the atomic set be retrieved. However, the entire atomic set manifest in the software program bundle for the software package is also retrieved as described herein.

For instance, with respect to FIG. 8, first main package 810 and second main package 818 of system 800 may be retrieved and installed as first application 802 and second application 804, respectively, although the entire atomic set of first atomic set manifest 806 and the entire atomic set of second atomic set manifest 808 would still list the software packages as shown. Likewise, if at least one but less than all of the optional packages in first atomic set manifest 806 were installed with first main package 810, the atomic set of first atomic manifest 806 would remain unchanged.

It should be noted, however, that examples contemplated herein allow for software packages that are not originally included in atomic sets, such as fourth optional package 822, to be added to atomic sets at system 800 (and/or at client device 302 of FIG. 3, e.g., by atomic deployment manager 312 of FIG. 3 as described in further detail herein.

Given that the atomic set defines the dependencies and required versions of program packages (and corresponding installed applications) for interoperation, the examples and techniques herein provide for mechanisms by which atomic sets are maintained when a software package (e.g., a main software package) and/or a related optional software package fail to install (or update and install) properly subsequent to being retrieved as described above.

Figure 10:
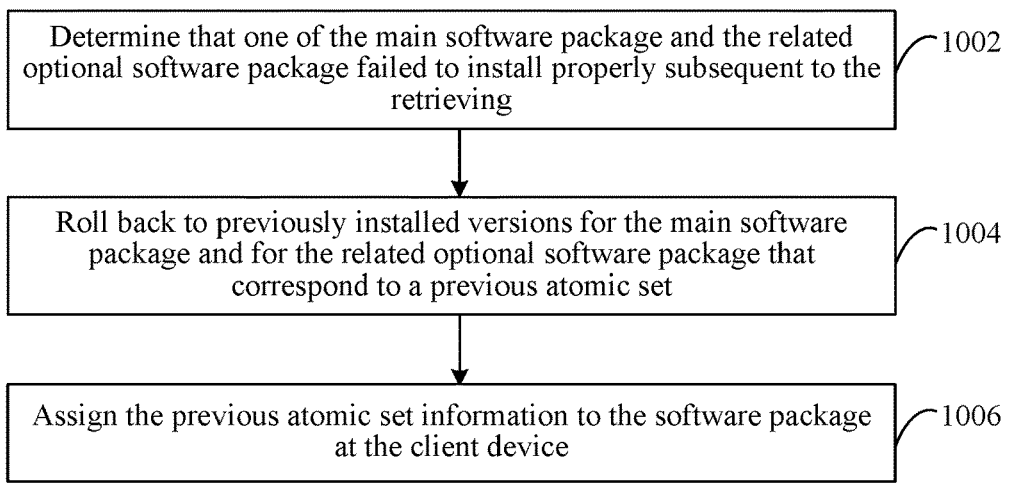
FIG. 10 shows a flowchart of a process for failure recovery from a failure of related software packages to install, according to an example.

For instance, FIG. 10 shows a flowchart 1000 of a process for atomic set software package deployment, according to an example. Flowchart 1000 may be a further example of flowchart 400 of FIG. 4, flowchart 600 of FIG. 6, and/or flowchart 700 of FIG. 7. For purposes of illustration, flowchart 1000 of FIG. 10 is described with respect to system 800 of FIG. 8 and also with reference to client system 300 of FIG. 3 and FIG. 2. That is, end user client 204 of FIG. 2, client system 300 of FIG. 3, and/or system 800 of FIG. 8 may perform their respective functions and operations in accordance with flowchart 1000. Further structural and operational examples will be apparent to persons skilled in the relevant art(s) based on the following description. Flowchart 1000 is described as follows.

In step 1002, it is determined that one of the main software package and the related optional software package failed to install properly subsequent to the retrieving. For instance, atomic deployment manager 312 is configured to retrieve a main software package and the related optional software package, e.g., as described with respect to step 408 of flowchart 400 and step 602 of flowchart 600, for installation at a client device (e.g., client device 302) or system (system 800). When an error, interruption, or device/system failure occurs that prevents proper installation of retrieved software packages, atomic deployment manager 312 is configured to determine that one of the main software package and the related optional software package failed to install properly.

For example, referring to system 800 of FIG. 8, let first application 802 include installed first main package 810, first optional package 812, and second optional package 814. When an end user desires to update second optional package 814 which is available at a host server, e.g., distribution host 206 of FIG. 2, system 800, which may be a further example of client system 300 and client device 302 of FIG. 3, may perform the steps of flowchart 400 of FIG. 4 and flowchart 600 of FIG. 6 in order to retrieve the latest version of second optional package 814, as well as the latest version of first main package 810. With regard to first atomic set 806, the latest version available at the host server may be v.2 of first main package 810, and may be v.4 of second optional package 814, which may be indicated as compatible versions in a first atomic set manifest (the current installed versions at system 800 are v.1 and v.3 , respectively, which may be indicated in a first atomic set manifest as compatible versions). First main package 810 may properly install to v.2, however, second optional package 814 may not properly install to v.4, and atomic deployment manager 312 is configured to determine that second optional package 814 was not properly installed.

In step 1004, the main software package and the related optional software package are rolled back to previously installed versions that correspond to a previous atomic set. For instance, atomic deployment manager 312 is configured to roll back the main software package and the related optional software package to previously installed versions, such as the versions that correspond to the prior atomic set. In examples, atomic deployment manager 312 may be configured to install new software packages and/or existing installed software packages to be updated without deleting or altering other software packages that may be affected by a failed or corrupt installation for new or updated software packages, e.g., via alternate or temporary installation paths. Additionally, atomic set manifests for prior installed versions of software packages may remain at a client device/system to facilitate rollbacks.

For example, referring again to system 800 of FIG. 8 and the example scenario described above with respect to step 1002, when v.4 of second optional package 814 is not properly installed, atomic deployment manager 312 is configured to rollback second optional package 814 to prior version v.3 and to rollback first main package 810 to v.1 even though v.2 of first main package 810 was properly installed. That is, atomic deployment manager 312 is configured to rollback each software package of a new atomic set to the prior atomic set versions if any installations/updates of the new atomic set versions fail. In this example scenario, the failure to install v.4 of second optional package 814 requires atomic deployment manager 312 to rollback second optional package 814 to prior version v.3 and to rollback first main package 810 to v.1 according to first atomic set 806 as illustrated in FIG. 8. This is because the atomic set information either associates v.1 of first main package 810 with v.3 of second optional package 814 (in the first atomic set manifest) or associates v.2 of first main package 810 with v.4 of second optional package 814 (in the second atomic set manifest), but no atomic set information associates v.2 of first main package 810 with v.3 of second optional package 814 as compatible versions.

In step 1006, the previous atomic set information is assigned to the software package at the client device. For instance, atomic deployment manager 312 is configured to assign the atomic set manifest corresponding to the rolled-back versions of second optional package 814 (prior version v.3) and of first main package 810 (prior version v.1) to installed and rolled-back first main package 810 (i.e., first application 802), as illustrated in first atomic set 806 of FIG. 8 (and indicated in the first atomic set manifest).

In some examples, a previously uninstalled software package may be retrieved by a client device/system from a host server for use with an existing, installed software application that corresponds to one or more previously retrieved software packages, such as a main software package and zero or more related optional software packages. For example, an end user may wish to install a newly published component (i.e., a software package) of a software productivity suite, or a new expansion set or DLC (i.e., a software package) for a gaming application. Similarly, previously published software packages for installed applications may be desired by an end user at some later time. The described client device/system examples may be configured to operate in various ways to enable previously uninstalled software packages to be incorporated into existing applications and their associated atomic set manifests for the purposes of joint software package servicing.

Figure 11:
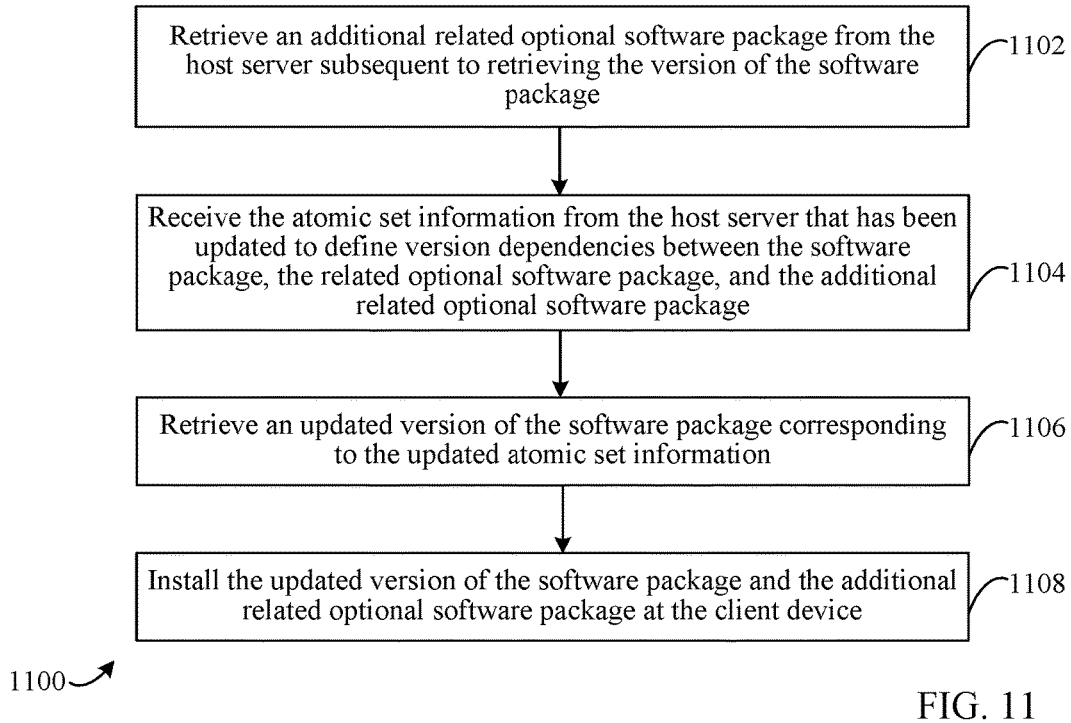
FIG. 11 shows a flowchart of a process for installation of an additional related software package of an atomic set, according to an example.

For instance, FIG. 11 shows a flowchart 1100 of a process for atomic set software package deployment, according to an example. Flowchart 1100 may be a further example of flowchart 400 of FIG. 4, flowchart 600 of FIG. 6, and/or flowchart 700 of FIG. 7. For purposes of illustration, flowchart 1100 of FIG. 11 is described with respect to system 800 of FIG. 8 and also with reference to client system 300 of FIG. 3 and FIG. 2. That is, end user client 204 of FIG. 2, client system 300 of FIG. 3, and/or system 800 of FIG. 8 may perform their respective functions and operations in accordance with flowchart 1100. Further structural and operational examples will be apparent to persons skilled in the relevant art(s) based on the following description. Flowchart 1100 is described as follows.

In step 1102, an additional related optional software package is retrieved from the host server subsequent to retrieving the version of the software package. For example, atomic deployment manager 312 of FIG. 3 is configured to retrieve a related optional software package, e.g., an additional related optional software package, from a host server such as distribution host 206 of FIG. 2 according to flowchart 400 of FIG. 4 and/or flowchart 600 of FIG. 6.

In an example, such as is shown in FIG. 8, an application corresponding to one or more software packages, e.g., first application 802, may be installed at a client system or device such as client system 800. A newly- or previously-published related optional software package (i.e., the additional related optional software package in step 1102) is retrieved, as similarly described above, after first main package 810 is installed as first main application 802. When a newly- or previously-published related optional software package is published at a host server subsequent to a previously retrieved main software package being installed at a client system/device, the atomic set manifest associated with a corresponding main software package is also updated at the host server to include a version value of the newly- or previously-published related optional software package. Accordingly, in such cases, the available software packages at the host server have an atomic set manifest that is updated with respect to the atomic set manifest for the previously retrieved main software package that is installed at the client system/device. Alternatively, a previously-published related optional software package published at a host server prior to a previously retrieved main software package being installed at a client system/device would be included in atomic set manifests at both the host server and the client system/device.

In step 1104, the atomic set information from the host server that has been updated to define version dependencies between the software package, the related optional software package, and the additional related optional software package is received. For example, atomic deployment manager 312 of FIG. 3 is configured to receive the atomic set information as described herein, which may include receiving the atomic set manifest of a software program bundle itself from the host server. In examples, and as noted above, an updated or existing atomic set manifest or information thereof may reflect a required atomic set for the software package, the related optional software package, and the additional related optional software package. In some cases, even when the existing atomic set manifest at the host server matches the atomic set manifest at the client system/device, the existing atomic set manifest at the host server may be received for version verification of the software packages.

In step 1106, an updated version of the software package corresponding to the updated atomic set information is retrieved. In some examples, as discussed above, step 1106 may be optional and/or not performed. For instance, in cases where the existing atomic set manifest at the host server matches the atomic set manifest at the client system/device, a new version of the software package is not required to be retrieved as the version available at the host server is the same as the version installed at the client system/device.

In other examples, atomic deployment manager 312 of FIG. 3 is configured to retrieve the updated version of the software package that corresponds to the updated atomic set information from the host server, e.g., as similarly described in flowchart 400 of FIG. 4 and flowchart 600 of FIG. 6.

In step 1108, the updated version of the software package and the additional related optional software package are installed at the client device. For example, the updated version of the software package and the additional related optional software package are installed at the client device in a manner that is similar to step 702 of flowchart 700 of FIG. 7 described above. Additionally, step 1108 may also include assigning the updated atomic set information to the installed application corresponding to the main software package at the client device in a manner that is similar to step 704 of flowchart 700 of FIG. 7.

Referring again to FIG. 8 and client system 800, applications corresponding to one or more software packages, e.g., first application 802 and second application 804, may be installed at a client system or device such as client system 800, in an example. The examples and techniques herein provide for mechanisms by which a software package that may be utilized by more than one installed application may be assigned to an atomic set of a first installed application to the exclusion of an atomic set manifest of a second installed application.

Figure 12:
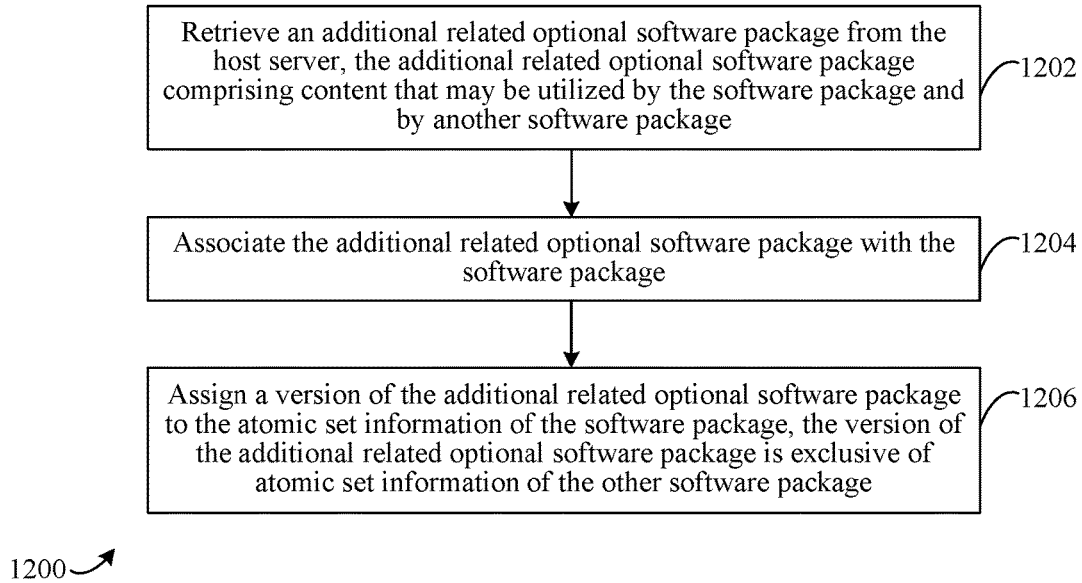
FIG. 12 shows a flowchart of a process for installation of related content indicated in an atomic set, according to an example.

As described above, optional packages listed in an atomic set manifest may include content. For instance, FIG. 12 shows a flowchart 1200 of a process for atomic set software package deployment, according to an example. Flowchart 1200 may be a further example of flowchart 400 of FIG. 4, flowchart 600 of FIG. 6, flowchart 700 of FIG. 7, and/or flowchart 1100 of FIG. 11. For purposes of illustration, flowchart 1200 of FIG. 12 is described with respect to system 800 of FIG. 8 and also with reference to client system 300 of FIG. 3 and FIG. 2. That is, end user client 204 of FIG. 2, client system 300 of FIG. 3, and/or system 800 of FIG. 8 may perform their respective functions and operations in accordance with flowchart 1200. Further structural and operational examples will be apparent to persons skilled in the relevant art(s) based on the following description. Flowchart 1200 is described as follows.

In step 1202, an additional related optional software package is retrieved from the host server, the additional related optional software package comprising content that may be utilized by the software package and by another software package. For example, a newly- or previously-published related optional software package such as fourth optional package 822 of FIG. 8 may be retrieved by atomic deployment manager 312 of FIG. 3, as described herein. Fourth optional package 822 may be retrieved independently of the software packages corresponding to first application 802 and/or second main application 804. As previously noted, fourth optional package 822 may be utilized by first main application 802 or second main application 804.

In step 1204, the additional related optional software package is associated with the software package. For instance, atomic deployment manager 312 of FIG. 3 may be configured to associate fourth optional package 822 with first application 802. In an example, indicia of an end user request or instruction to perform the association may be received by atomic deployment manager 312 via a UI of first application 802 or UI 306 of OS 304 of FIG. 3, or by another mechanism, such as but without limitation, a script, a remote instruction from an administrative system, and/or the like. As an illustrative example, an end user using first application 802 may elect to import or install fourth optional package 822 through a UI (e.g., buttons or menus) of first application 802.

In step 1206, a version of the additional related optional software package is assigned to the atomic set information of the software package, where the version of the additional related optional software package is exclusive of atomic set information of the other software package. For example, atomic deployment manager 312 of FIG. 3 may be configured to assign the additional related optional software package (e.g., fourth optional package 822) to the atomic set manifest of first application 802 that corresponds to installed first main package 810. Atomic deployment manager 312 may also be configured to enforce mutual exclusivity between installed applications for packages in their respective atomic sets. That is, if fourth optional package 822 is assigned to first atomic set 806 of first application 802, fourth optional package 822 cannot be assigned to second atomic set 808 of second application 804, in examples. In other words, atomic deployment manager 312 may be configured to prevent the addition of a software package present in an atomic set to another atomic set.

Additionally, in some examples, a software package that does not initially have versioning associated therewith, such as a software package comprising media or multi-media content, that is saved at system 800 (e.g., fourth optional package 822, in one such example), may be added to first atomic set 806 or to second atomic set 808 by atomic deployment manager 312. Atomic deployment manager 312 may be configured to assign a version to previously non-versioned software packages when they are added to an atomic set embodied by an atomic set manifest.

Figure 13:
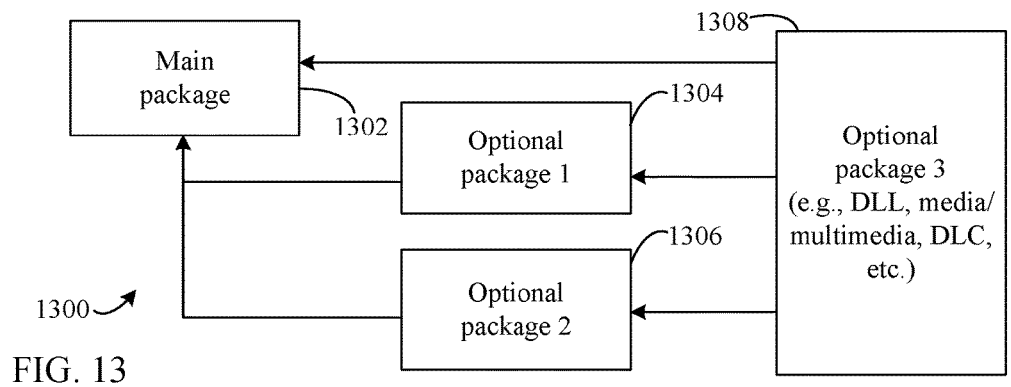
FIG. 13 shows a block diagram of a shared software package for an atomic set, according to an example.

The examples herein may be also configured in various ways to enable software packages with multiple dependencies in atomic set manifests to be jointly serviced. FIG. 13 shows a block diagram of a shared software package for an atomic set 1300, according to an example. As illustrated in FIG. 13, atomic set 1300 includes a main package 1302, a first optional package 1304, a second optional package 1306, and a third optional package 1308.

The illustrated arrows in atomic set 1300 designate dependencies for the software packages of the atomic sets (i.e., arrows start at dependent packages and point to packages from which the dependent packages depend). Main package 1302 does not depend from any other packages in atomic set 1300. First optional package 1304 and second optional package 1306 each depend from main package 1302. Third optional package 1308 is shown as being dependent from each of main package 1302, first optional package 1304, and second optional package 1306. However, in examples, third optional package 1308 may be dependent from any two of main package 1302, first optional package 1304, and second optional package 1306. Third optional package 1308 may include content such as shared library files (e.g., DLLs) or other resource files, media/multi-media content, DLC(s), that two or more software packages of an atomic set reference.

Figure 14:
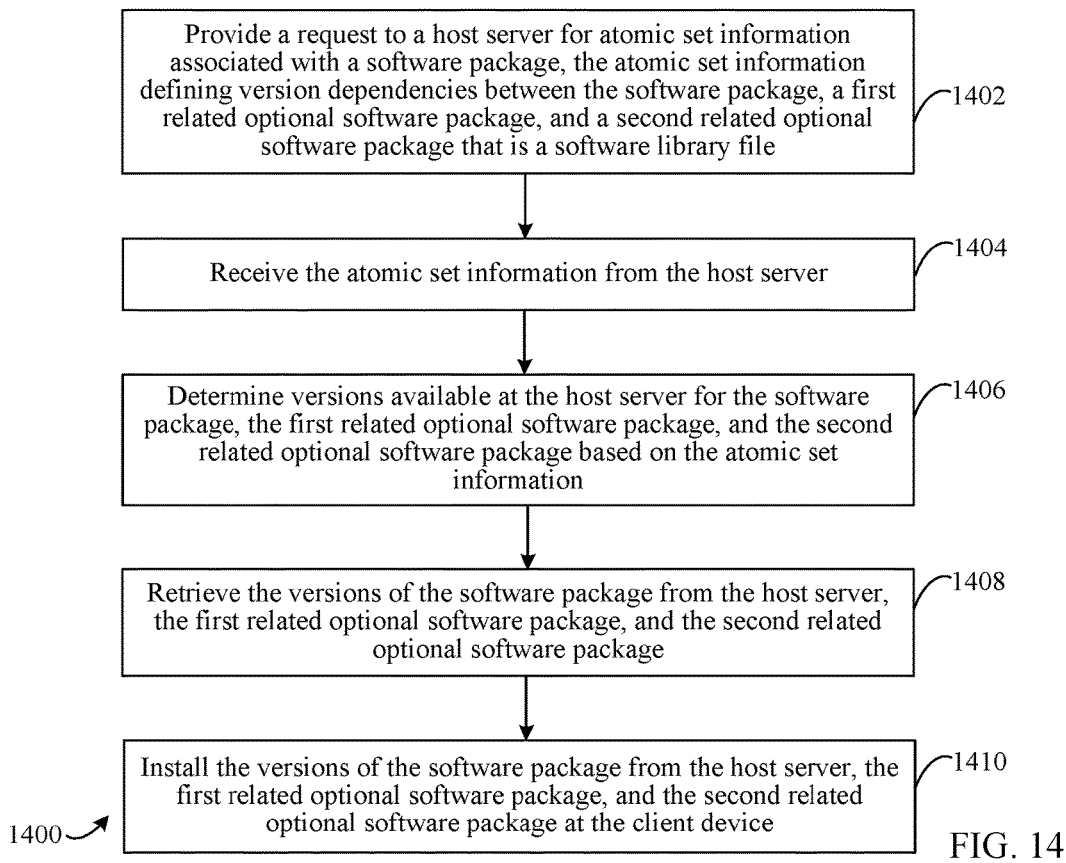
FIG. 14 shows a flowchart of a process for deployment of software packages in an atomic set that includes a software library file, according to an example.

Referring also to FIG. 14, a flowchart 1400 of a process for atomic set software package deployment is shown, according to an example. Flowchart 1400 may be a further example of flowchart 400 of FIG. 4, flowchart 600 of FIG. 6, and/or flowchart 700 of FIG. 7. For purposes of illustration, flowchart 1400 of FIG. 14 is described with respect to atomic set 1300 of FIG. 13 and also with reference to client system 300 of FIG. 3 and FIG. 2. That is, end user client 204 of FIG. 2 and/or client system 300 of FIG. 3 may perform their respective functions and operations in accordance with flowchart 1300. Further structural and operational examples will be apparent to persons skilled in the relevant art(s) based on the following description. Flowchart 1400 is described as follows.

In step 1402, a request is provided to a host server for atomic set information associated with a software package, the atomic set information defining version dependencies between the software package, a first related optional software package, and a second related optional software package that is a software library file. For example, the request may be provided to a host server such as distribution host 206 of FIG. 2 from atomic deployment manager 312 of client device 302 via I/O interface 314.

In examples, an indication may be received by atomic deployment manager 312 to provide the request. The indication may be generated by an end user via one of main applications 308 installed at client device 302 and/or UI 306 where the end user desires to update the software package, e.g., a main software package corresponding to one of main applications 308, and/or a number of related optional applications 310. Alternatively, the indication may be received from distribution host 206 to notify client device 302 that an update for the one of main applications 308 and/or a number of related optional applications 310. In some examples, the indication may be provided responsive to the execution of an installation script by a deployment engine of OS 304 at client device 302 or another device associated with client device 302 where it is desired to newly install an additional one of main applications 308 at client device 302.

As an example scenario, an end user may desire to newly install or update their application for Microsoft® Office® from Microsoft Corporation, although any example application may be considered in this scenario such as iWork® from Apple, Inc., Adobe® PhotoShop® from Adobe Systems Incorporated, etc., gaming applications, and/or the like. The user may provide the indication to prompt a request for atomic set information associated with the main software package of the Microsoft® Office® application to be provided to distribution host 206 from atomic deployment manager 312 at client device 302. Related optional software packages for Microsoft® Office®, e.g., Microsoft® Word, Microsoft® PowerPoint®, Microsoft® Excel®, etc., from Microsoft Corporation may also be desired by the end user for installation or updating. The second related optional software package is a software library file, such as a DLL, that may be shared between one or more related optional software packages, and/or between the main software package and one or more related optional software packages. As illustrated in atomic set 1300 of FIG. 13, the second related optional software package may be third optional package 1308.

In step 1404, the atomic set information is received from the host server. For instance, atomic set information from an atomic set manifest in a software program bundle of software program bundles 208 of FIG. 2 is provided from distribution host 206 to client device 302 of FIG. 3 where it is received via I/O interface 314. The atomic set information, e.g., atomic set 1300 of FIG. 13, may be received by atomic deployment manager 312. The atomic set information may be stored in a memory of client device 302 for use in the steps of flowchart 1400. In examples, the entire atomic set manifest may be received.

In step 1406, versions available at the host server for the software package, the first related optional software package, and the second related optional software package are determined based on the atomic set information. For instance, atomic deployment manager 312 may parse the atomic set information received in step 1404 to determine the atomic set versions of the main software package, the first related optional software package, and the second related optional software package, as well as any other related optional applications in the software program bundle of software program bundles 208 available at distribution host 206 of FIG. 2.

In step 1408, the versions of the software package from the host server, the first related optional software package, and the second related optional software package are retrieved. For instance, atomic deployment manager 312 of FIG. 3 is configured to retrieve the versions of the software package, the first related optional software package, and the second related optional software package from the software program bundle that are specified in the atomic set information determined in step 1406 from distribution host 206 of FIG. 2 via I/O interface 314. Once retrieved, the packages may be stored for installation by client device 302.

In the examples described herein, versions of related software packages specified in atomic sets provide for proper functioning and interoperability. That is, the examples and techniques described herein allow for strict adherence to joint servicing of related software packages via atomic sets to prevent undesired and/or abnormal behaviors that may arise due to incompatible versions of software packages or unsupported features between software packages that share common components. In examples, when a related optional software package is updated and/or installed, a main software package in the associated atomic set is also updated regardless of whether the main software application includes changes to software code for to the related optional software package, or whether only the version value of the related optional software package is new or changed in the associated atomic set manifest (in which case the main software package may only be updated to assign the associated atomic set manifest. Likewise, when a software package that is dependent on or that depends from one or more other software packages is installed and/or updated, each other dependent or depending software package is also required to be installed and/or updated to ensure compatible/operable versions of software packages are used together, in examples.

Figure 15:
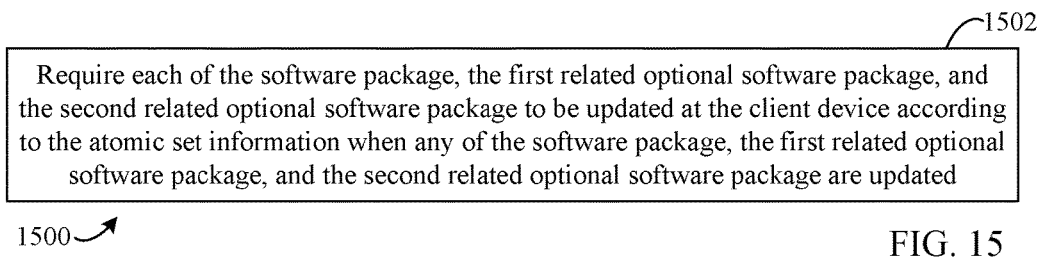
FIG. 15 shows a flowchart of a process for coordinated update of software packages of an atomic set, according to an example.

For instance, FIG. 15 shows a flowchart 1500 of a process for atomic set software package deployment, according to an example. Flowchart 1500 may be a further example of flowchart 400 of FIG. 4, flowchart 600 of FIG. 6, flowchart 700 of FIG. 7 and/or flowchart 1400 of FIG. 14. For purposes of illustration, flowchart 1500 of FIG. 15 is described with respect to atomic set 1300 of FIG. 13 and also with reference to client system 300 of FIG. 3 and FIG. 2. That is, end user client 204 of FIG. 2 and/or client system 300 of FIG. 3 may perform their respective functions and operations in accordance with flowchart 1500. Further structural and operational examples will be apparent to persons skilled in the relevant art(s) based on the following description. Flowchart 1500 is described as follows.

In step 1502, each of the software package, the first related optional software package, and the second related optional software package is required to be updated at the client device according to the atomic set information when any of the software package, the first related optional software package, and the second related optional software package are updated. For example, atomic deployment manager 312 of FIG. 3 is configured to require each other software package to be updated when the second related optional software package (that is a common or shared software package) is updated based on the atomic set.

With respect to the example scenario in step 1402, the main software package for Microsoft® Office®, a related optional package, e.g., one of Microsoft® Word, Microsoft® PowerPoint®, Microsoft® Excel®, etc., and a shared library file, such as a DLL, along with their associated atomic set manifest, are retrieved and stored by atomic deployment manager 312 at client device 302 based on the atomic set information.

As noted above, atomic deployment manager 312 is configured to strictly enforce lock-step joint software package servicing according to the atomic set in the atomic set manifest for the software packages. Attempts to install versions of software packages from another atomic set, or incorrect versions of software packages that conflict with an atomic set, may be denied by atomic deployment manager 312. In some examples, atomic deployment manager 312 may be configured to maintain, or roll back to, existing installed versions of software packages subsequent to denying such installations. In other examples, atomic deployment manager 312 may be configured to automatically retrieve correct and/or updated versions of software packages, according to atomic set information, as described in the flowcharts above, subsequent to denying such installations.

In step 1410, the versions of the software package, the first related optional software package, and the second related optional software package are installed at the client device from the host server. For instance, once retrieved as in step 1408, the software package and the related optional software packages may be stored and installed by client device 302 to respectively be a main application of main applications 308 and related optional applications of related optional applications 310. Upon receipt of the software package and the related optional software packages, installation may begin automatically by client device 302, e.g., initiated by atomic deployment manager 312, or may begin based on an input of the end user via UI 306 or a UI of an application executing on client device 302.

Additionally, the atomic set manifest in the software program bundle from which the atomic set information was received in step 1404 may be stored and associated with the software package when installed.

Figure 16:
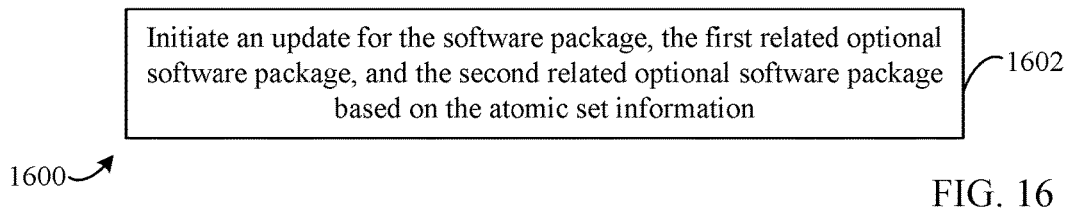
FIG. 16 shows a flowchart of a process for initiating coordinated update of software packages of an atomic set, according to an example.

The examples herein may be also configured in various ways to initiate updates for software packages as described herein. For instance, FIG. 16 shows a flowchart 1600 of a process for atomic set software package deployment, according to an example. Flowchart 1600 may be a further example of any flowchart described above. For purposes of illustration, flowchart 1600 of FIG. 16 is described with respect to atomic set 1300 of FIG. 13 and also with reference to client system 300 of FIG. 3 and FIG. 2. That is, end user client 204 of FIG. 2 and/or client system 300 of FIG. 3 may perform their respective functions and operations in accordance with flowchart 1600. Further structural and operational examples will be apparent to persons skilled in the relevant art(s) based on the following description. Flowchart 1600 is described as follows.

In step 1602, an update for the software package, the first related optional software package, and the second related optional software package is initiated based on the atomic set information. For example, atomic deployment manager 312 may be configured to initiate an update of software packages. The initiation may be performed responsive to end user inputs, information received from a host server, a time of day or time since a new version of a software package was published, and/or the like.

In examples, atomic deployment manager 312 may initiate an update of software packages prior to the first step of any flowchart described above.

Figure 17:
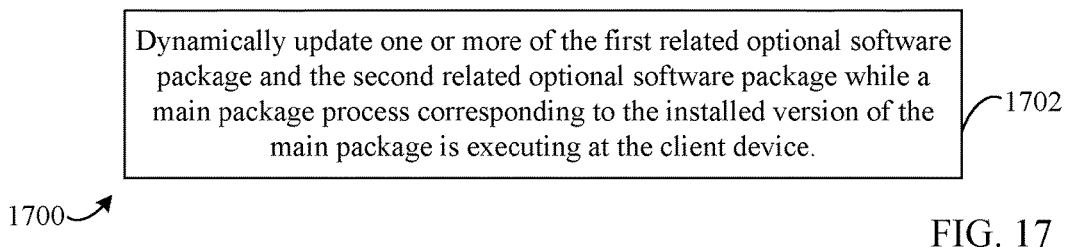
FIG. 17 shows a flowchart of a process for dynamic updating of software packages of an atomic set, according to an example.
Figure 18:
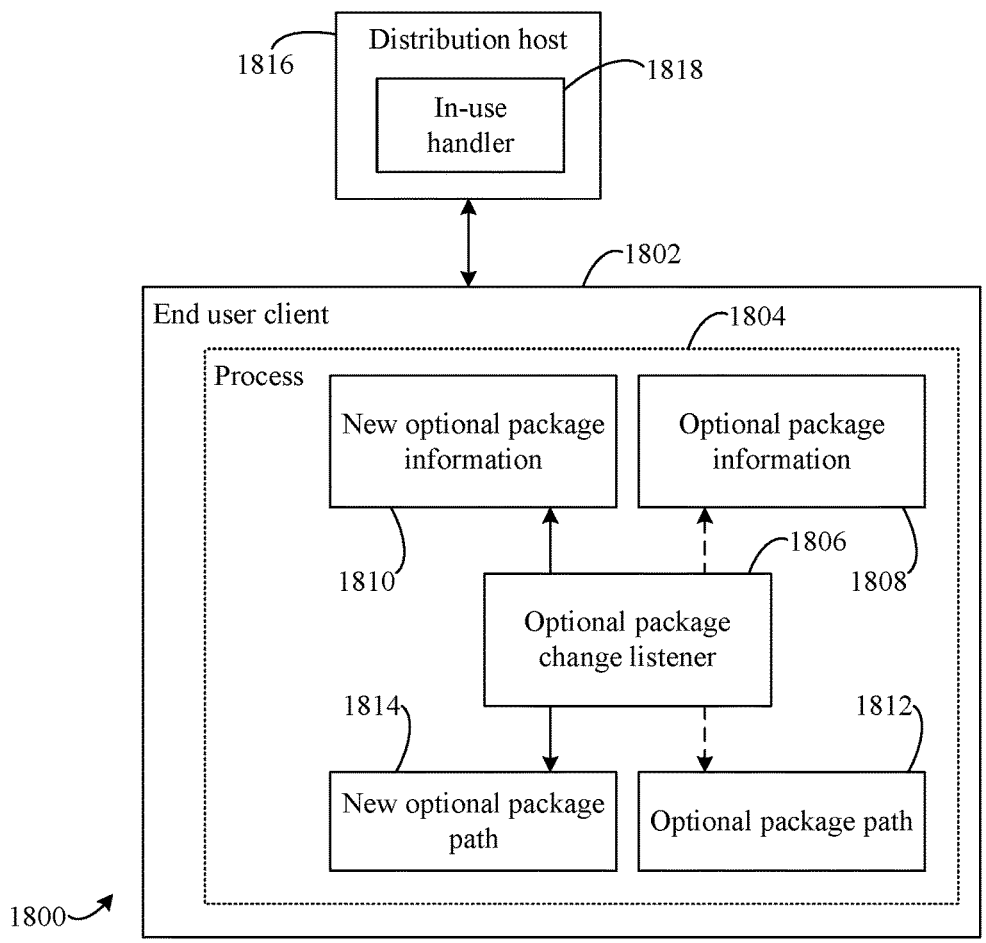
FIG. 18 shows an atomic set deployment system for dynamic updating of software packages, according to an example.

The examples herein may be also configured in various ways to enable dynamic updates for related optional software packages as described herein while main software applications corresponding to main software packages are being executed at client systems/devices. For instance, FIG. 17 shows a flowchart 1700 of a process for atomic set software package deployment, according to an example. Flowchart 1700 may be a further example flowchart 1600 of FIG. 16, and may also be a further example of any flowchart described above. For purposes of illustration, flowchart 1700 of FIG. 17 is described with respect to FIG. 18 and also with reference to client system 300 of FIG. 3 and FIG. 2. FIG. 18 shows an example an atomic set deployment system 1800 for dynamic updating of software packages, according to an example. As shown in FIG. 18, system 1800 includes an end user client 1802, which may be a further example of end user client 204 of FIG. 2, client system 300 of FIG. 3, and/or client system 800 of FIG. 8, and a distribution host 1816 that may be a further example of distribution host 206 of FIG. 2. Distribution host 1816 includes an in-use handler 1818, and end user client 1802 includes an optional package change listener 1806.

End user client 1802, as well as end user client 204 of FIG. 2, client system 300 of FIG. 3, and/or client system 800 of FIG. 8, may perform their respective functions and operations in accordance with flowchart 1700. Further structural and operational examples will be apparent to persons skilled in the relevant art(s) based on the following description. Flowchart 1700 is described as follows.

In step 1702, one or more of the first related optional software package and the second related optional software package are dynamically updated while a main package process (e.g., an executing software application or portion thereof) corresponding to the installed version of the main package is executing at the client device. For instance, optional package change listener 1806 may be configured to facilitate dynamic updating of one or more optional software packages related to a main software package while an installed main application related to the main software package is executing on a client system/device. Optional package change listener 1806 may be a separate component in examples, or may be a further example or a component of atomic deployment manager 312 of FIG. 3. For instance, in examples where optional package change listener 1806 is a component of atomic deployment manager 312, optional package change listener 1806 may be part of a main application, e.g., a process 1804 executing on end user client 1802.

In an example, a request to update one or more related optional software packages may originate from process 1804 executing on end user client 1802, e.g., as similarly described above with respect to step 1602 of flowchart 1600. The request may specify that that the update is a dynamic or asynchronous update, i.e., that the executing process is requesting an update for a related optional software package. Package change listener 1806. The request may be received by distribution host 1816 at in-use handler 1818. In-use handler 1818 is configured to determine if related optional software packages that are in use have updated versions available at deployment host 1816.

If it is determined that one or more updated versions are available, deployment host 1816 may provide, or end user client 1802 may retrieve, the updated versions of the available optional software packages for installation at end user client 1802. As the updated versions of the available optional software packages are installed, optional package change listener 1806 may maintain optional package information 1808, which may comprise process information, and/or other information about the currently installed version of the related optional package, such as version values, and may maintain optional package path 1812, which may comprise main and optional package paths. The updated versions of the available optional software packages may install new optional package information 1810, which may comprise updated process information, and/or other information about the newly installed version of the related optional package, such as version values, and may maintain new optional package path 1812, which may comprise new main and optional package paths.

Upon proper/successful completion of the new installation of the updated versions, process 1804 may begin to utilize the new versions of the optional software packages either with, or without, restarting process 1804, in examples. Optional package change listener 1806 may be configured to maintain or delete optional package information 1808 and/or optional package path 1812 subsequent to proper/successful completion.

C. Joint Servicing Developer Examples

Figure 19:
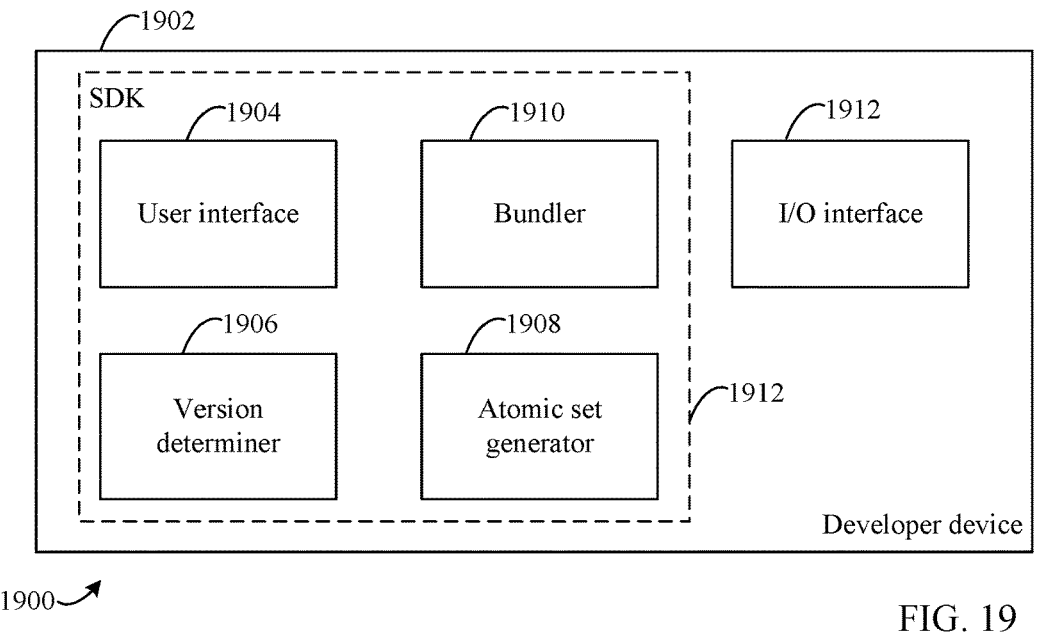
FIG. 19 shows a block diagram of a developer system for developing software packages in an atomic set, according to an example.

FIG. 19 shows a block diagram of a developer system 1900, according to an example. Developer system 1900 may be a further example of developer client 210 of FIG. 2. As shown in FIG. 19, developer system 1900 includes a developer device 1902 e.g., a developer client) that comprises a plurality of components. Developer device 1902 may be any type computing device, as described herein. Developer client 1902 includes an I/O interface 1912, as well as a UI component 1904, a version determiner 1906, an atomic set generator 1908, and a bundler 1910 which may comprise a portion of a software development kit (SDK) 1914, in an example. In examples, SDK 1914 may comprise software development suite, such as Microsoft® Visual Studio® or the like, that may be executed for use by a developer at developer system 1900. Developer system 1900 may also include additional components (not shown for brevity and illustrative clarity) such as, but not limited to, those described below with respect to FIGS. 23 and 24. For instance, developer system 1900 may also include at least one memory configured to store program instructions, and at least one processor configured to execute the program instructions.

I/O interface 1912 may be any type of network adapter, modem, etc., configured to enable developer device 1902 to communicate with one or more other devices over a network, e.g., such as communicating with distribution host 206 described above with respect to FIG. 2.

Figure 20:
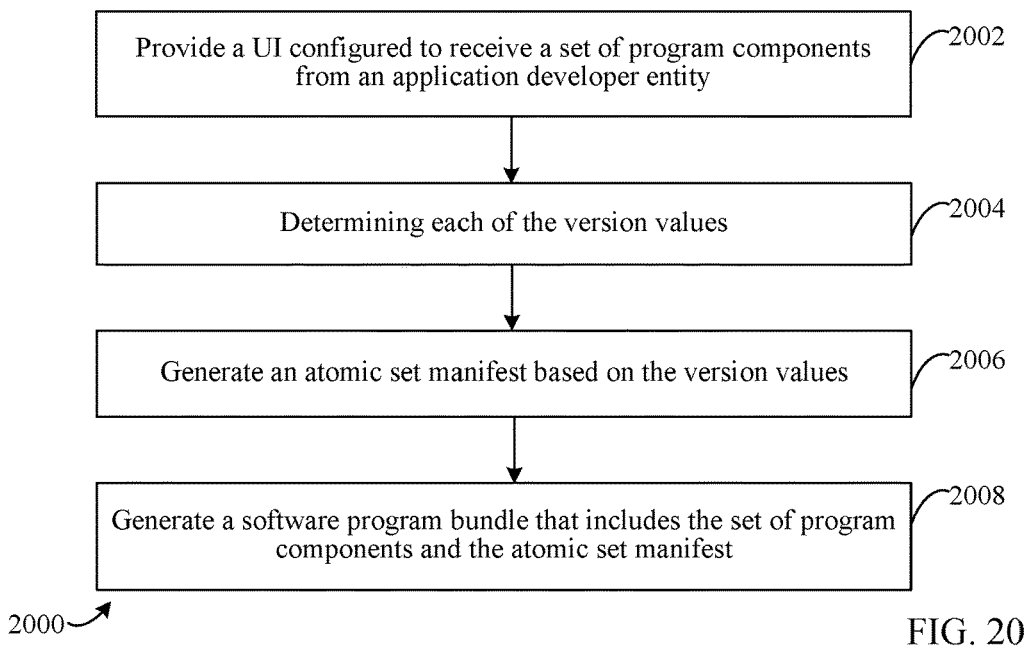
FIG. 20 shows a flowchart of a process for enabling a developer to deploy software packages in an atomic set, according to an example.

Developer devices and systems for joint servicing of software packages such as developer system 1900 and developer device 1902 of FIG. 19 may be enabled in various ways according to examples. For example, FIG. 20 shows a flowchart 2000 of a process for atomic set software package deployment, according to an example. For purposes of illustration, flowchart 2000 of FIG. 20 is described with respect to developer system 1900 of FIG. 19 and also with reference to FIG. 2. That is, developer client 204 of FIG. 2 and/or developer system 1900 of FIG. 19 may perform their respective functions and operations in accordance with flowchart 2000. Further structural and operational examples will be apparent to persons skilled in the relevant art(s) based on the following description. Flowchart 2000 is described as follows.

In step 2002, a UI configured to receive a set of program components from an application developer entity is provided. For instance, UI component 1904 of developer device 1902 of FIG. 19 may provide a UI for use by a developer for performing aspects of joint servicing of software packages, as described herein. In examples, the provided UI is configured to receive a set of program components from an application developer entity or a developer(s). The set of program components may include one or more of a main software package and an optional software package, and a version value for each software package in the set of program components.

The UI described in step 2002 may also be configured to accept options and/or additional information from the application developer entity or the developer(s). The options and/or additional information may include, without limitation, dependency information, atomic set information, software component descriptions, and/or the like. For instance, as illustrated in atomic set manifest 500 of FIG. 5, options and/or additional information may include, without limitation, a "Bundles Version," a "Bundle Version" specific to the software program bundle, a path for the bundle, a software package identifier, e.g., "<Identity Name="publisher.Main"" or "<Identity Name="publisher.Main.Optional_1"," and publisher information such as name and location data.

In examples, the software package and the optional software package may be a main software package and a related optional software package, as described herein, and may be developed by the application developer entity or the developer(s). For example, the application developer entity or the developer(s) may develop such software packages using SDK 1914 of FIG. 19. The software packages may correspond to full applications, such as gaming applications, productivity software suites, stand-alone applications etc., or may correspond to updates and/or add-on packages for existing software packages/applications.

In step 2004, each of the version values is determined. For instance, version determiner 1906 of FIG. 19 may be configured to determine the version values for the main software package and the optional software package received via the UI provided by UI component 1904, as described above in step 2002. In examples, the version values may be input directly by the developer via the provided UI, while in other examples, version determiner 1906 may be configured to parse of the main software package, the optional software package, and/or informational software components to determine their respective version values.

The version values or information associated therewith may also designate dependencies of the main software package and the optional software package. It should be noted that while two program components are described with respect to the set of program components, additional or fewer related software packages, as disclosed herein, may also be included, and respective version values and dependency information may be determined in step 2004.

In step 2006, an atomic set manifest is generated based on the version values. For example, atomic set generator 1906 of FIG. 19 may be configured to generate an atomic set manifest based on the version values determined in step 2004. In examples, atomic set generator 1906 is configured to generate an XML file representation of an atomic set as the atomic set manifest, as illustrated in atomic set manifest 500 of FIG. 5. Additionally, the options and/or additional information may be used by atomic set generator 1906 of FIG. 19 to generate the atomic set manifest. For instance, software component dependency information may also be used and may be determined from the software package identifier, as noted above. In examples, the generated atomic set manifest defines version dependencies between program components in the set of program components requiring the program components in the set of program components to be serviced together subsequent to installation at a client device.

In some examples, the generated atomic set manifest may comprise additional, published software packages.

In step 2008, a software program bundle that includes the set of program components and the atomic set manifest is generated. For instance, bundler 1910 of FIG. 19 may be configured to generate a software program bundle that includes the set of program components and the atomic set manifest. Bundler 1910 may bundle the set of program components and the atomic set manifest according to known bundling techniques that will, in addition and according to the techniques and examples herein, include the atomic set manifest described above.

Software program bundles may be published and/or provided to a host server such as distribution host 206 of FIG. 2 and/or distribution host 1816 of FIG. 18 for storage and/or distribution as described above (e.g., as illustrated by software program bundles 208 of FIG. 2). Additionally, software program bundles may be stored at developer device 1902 for subsequent use.

The examples herein are also configured to provide for generating software program bundles with software components, e.g., software packages, from different application developer entities and/or developers.

Figure 21:
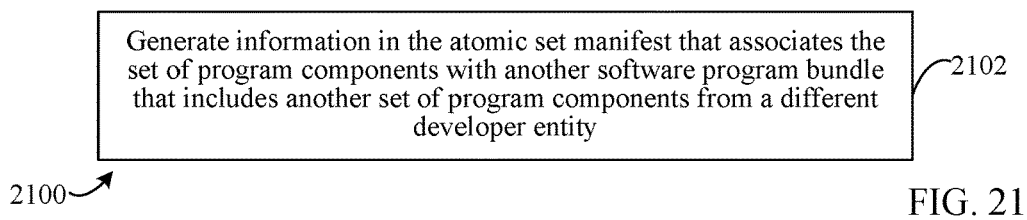
FIG. 21 shows a flowchart of a process for generating an atomic set manifest, according to an example.

FIG. 21 shows a flowchart 2100 of a process for atomic set software package deployment, according to an example. For purposes of illustration, flowchart 2100 of FIG. 21 is described with respect to developer system 1900 of FIG. 19 and also with reference to FIG. 2. That is, developer client 204 of FIG. 2 and/or developer system 1900 of FIG. 19 may perform their respective functions and operations in accordance with flowchart 2100. Flowchart 2100 of FIG. 21 may be a further example of flowchart 2000 of FIG. 20. Further structural and operational examples will be apparent to persons skilled in the relevant art(s) based on the following description. Flowchart 2100 is described as follows.

In step 2102, information in the atomic set manifest that associates the set of program components with another software program bundle that includes another set of program components from a different developer entity is generated. For example, atomic set generator 1912 of developer system 1900 may be configured to generate an atomic set manifest with such associating information. In examples, atomic set generator 1912 may associate program components of a software program bundle with another software program bundle based on path information and/or software package identifier information that is related to the other program bundle, although the association may be based on other types of information disclosed herein.

For instance, a developer or developer entity may develop a related optional software package (e.g., a software add-on or update or the like) for a main software package that is developed by a different developer or developer entity. In this example, the main software package may be included in a published software program bundle stored for distribution at a host server, e.g., at an online store. When atomic set generator 1912 generates an atomic set manifest for the related optional software package (e.g., similarly as in step 2006 of flowchart 2000 of FIG. 20), a portion of the atomic set manifest is generated to include the path or directory location for the published software package bundle. A portion for the atomic set manifest for the related optional software package may also be generated to include the name of the corresponding main software package for the published software bundle in the identifier tag set of the related optional software package. As a further illustrative example, and also referring back to FIG. 5 and atomic set manifest 500, the main software package atomic set manifest for the published software program bundle may include "<Identity Name="publisher1.Main"" for the main package tag set which may be followed by relevant information for "publisher1." However, in this further illustrative example, the related optional software package atomic set manifest may include "<Identity Name="publisher2.Main.Optional_1"" for the related optional software package tag set which may be followed by relevant information for "publisher2."

Accordingly, related optional software packages may be bundled in a way that creates an association with a main software package of a different developer/developer entity. It should be noted that while the software bundle generation techniques and examples noted above are discussed in terms of different developers, it is also contemplated herein that these techniques and examples may be similarly applied to software packages, and associated bundles, that are published by different publishers or publisher entities.

Figure 22:
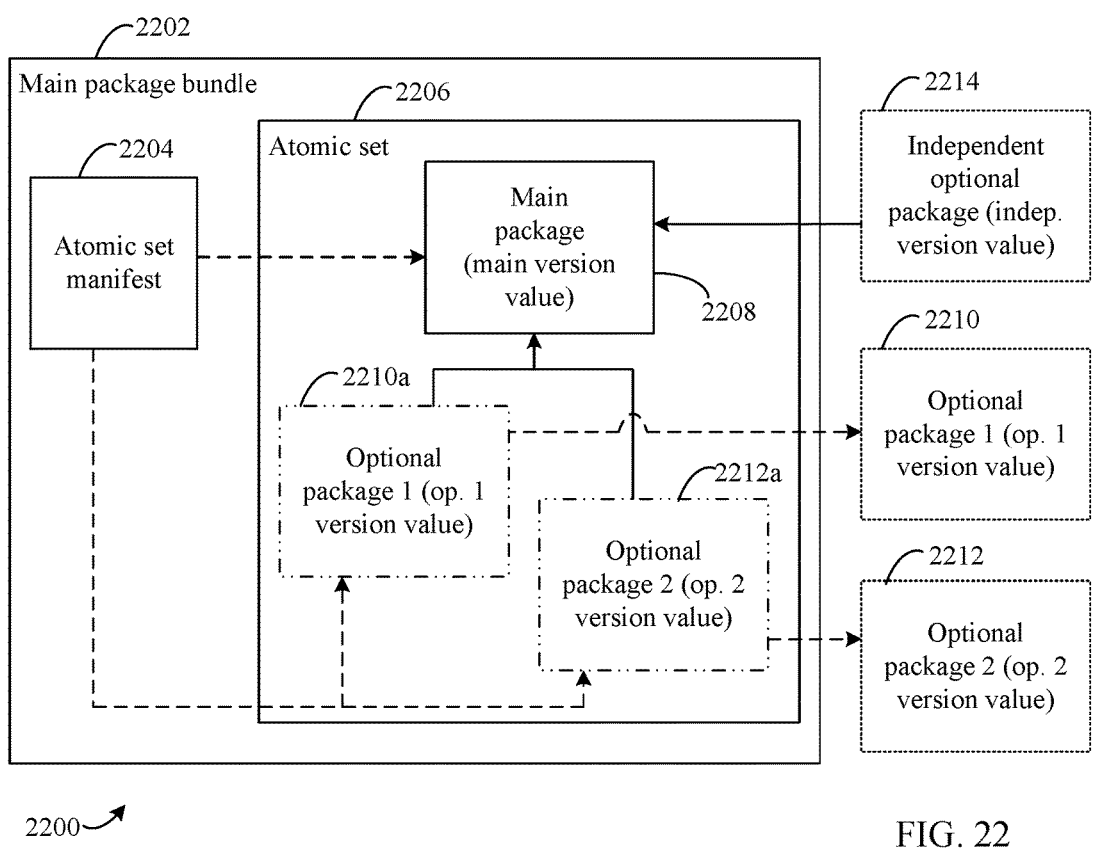
FIG. 22 shows a block diagram of a software program bundle, according to an example.

Referring also to FIG. 22, a block diagram of a software program bundle 2200 is shown, according to an example. Software program bundle 2200 may be generated according to flowchart 2000 of FIG. 20 and/or flowchart 2100 of FIG. 21 by bundler 1910 of FIG. 19, in examples. As noted above, software program bundles, along with associated related optional software packages, may be published and/or provided to a host server such as distribution host 206 of FIG. 2 and/or distribution host 1816 of FIG. 18 for storage and/or distribution.

Software program bundle 2200 includes a main package bundle 2202, an independent optional package 2214, a first optional package 2210, and a second optional package 2212. First optional package 2210 and second optional package 2212 may be related optional packages, as described herein, and independent optional package 2214 may be unrelated to, but utilizable by, main package 2208. Main package bundle 2202 includes an atomic set manifest 2204, and an atomic set 2206. Atomic set manifest 2204 may be similarly structured as atomic set manifest 500 of FIG. 5, in examples, and atomic set 2206 includes a main package 2208, a first optional package reference 2210*a*, and a second optional package reference 2212*a*. That is, in examples, the related optional packages, e.g., first optional package 2210 and second optional package 2212, may reside outside of main package bundle 2202 that may instead include a reference(s) to the related optional package(s).

Independent optional package 2214, as noted above, is not related to main package 2208 and therefore is not included in atomic set 2206 or atomic set manifest 2204. However, independent optional package 2214 may be added to atomic set 2206 and reflected in atomic set manifest 2204, as described above.

Each of the three optional packages illustrated in FIG. 22 may be separately bundled and associated with main package bundle 2202 as noted herein. The optional packages illustrated in FIG. 22 may have different developers/developer entities or publishers/publisher entities with respect to each other and/or with respect to main package 2208.

III. Example Mobile Device Implementation

Atomic deployment manager 102, host server 104, atomic deployment manager 102, end user client 204, distribution host 206, a developer client 210, client device 302, OS 304, UI 306, main application(s) 308, related optional applications 310, atomic deployment manager 312, end user client 1802, process 1804, optional package change listener 1806, distribution host 1816, in-use handler 1818, UI component 1904, version determiner 1906, atomic set generator 1908, bundler 1910, SDK 1912, flowchart 600, flowchart 700 flowchart 900, flowchart 1000, flowchart 1100, flowchart 1200, flowchart 1400, flowchart 1500, flowchart 1600, flowchart 1700, flowchart 2000, and/or flowchart 2100 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 23:
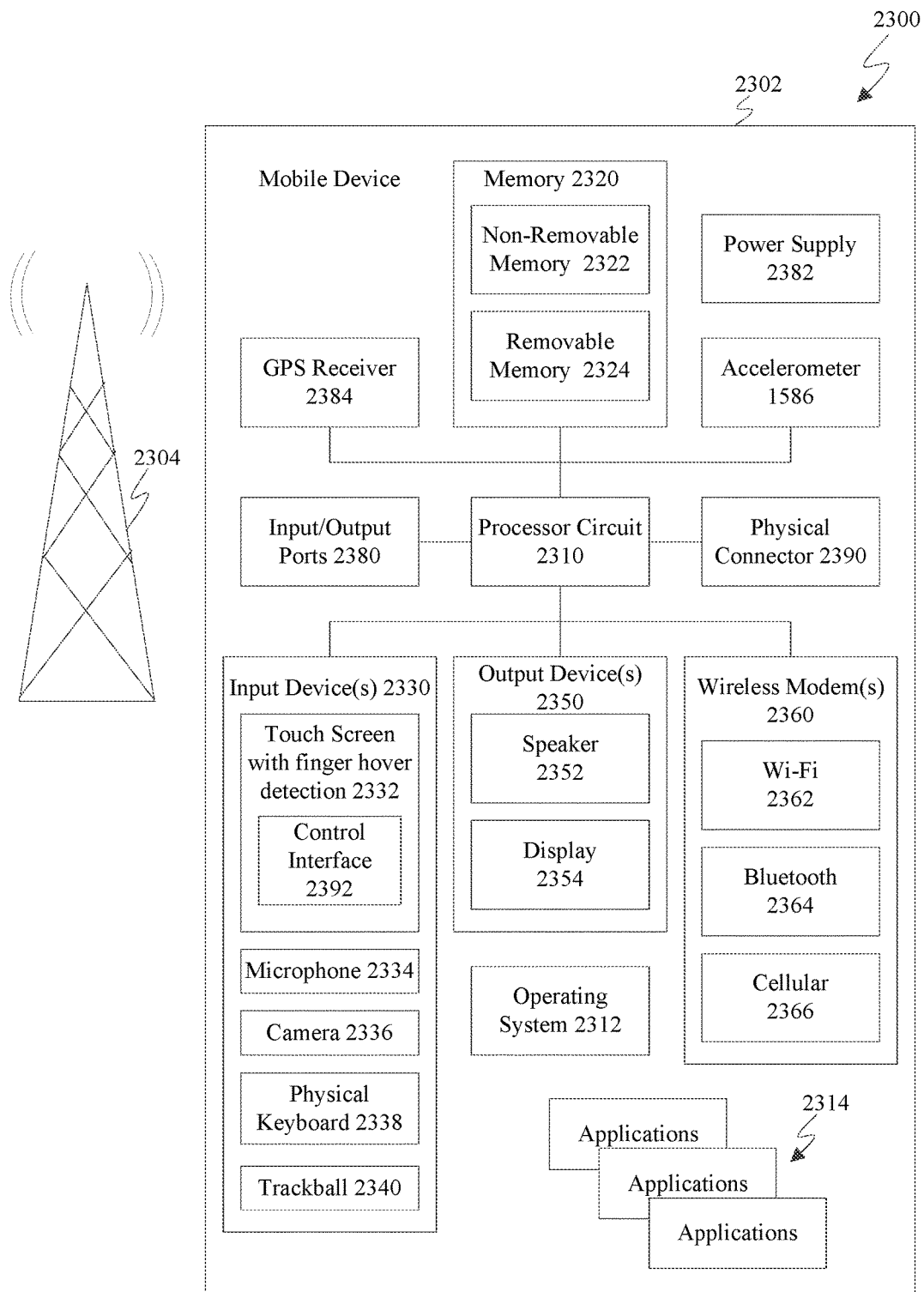
FIG. 23 shows a block diagram of an example mobile device that may be used to implement various examples.

FIG. 23 is a block diagram of an exemplary mobile system 2300 that includes a mobile device 2302 that may implement examples described herein. For example, mobile device 2302 may be used to implement any system, client, or device, or components/subcomponents thereof, in the preceding sections. As shown in FIG. 23, mobile device 2302 includes a variety of optional hardware and software components. Any component in mobile device 2302 can communicate with any other component, although not all connections are shown for ease of illustration. Mobile device 2302 can be any of a variety of computing devices (e.g., cell phone, smart phone, handheld computer, Personal Digital Assistant (PDA), etc.) and can allow wireless two-way communications with one or more mobile communications networks 2304, such as a cellular or satellite network, or with a local area or wide area network.

Mobile device 2302 can include a controller or processor 2310 (e.g., signal processor, microprocessor, ASIC, or other control and processing logic circuitry) for performing such tasks as signal coding, data processing, input/output processing, power control, and/or other functions. An operating system 2312 can control the allocation and usage of the components of mobile device 2302 and provide support for one or more application programs 2314 (also referred to as "applications" or "apps"). Application programs 2314 may include common mobile computing applications (e.g., e-mail applications, calendars, contact managers, web browsers, messaging applications) and any other computing applications (e.g., word processing applications, mapping applications, media player applications).

Mobile device 2302 can include memory 2320. Memory 2320 can include non-removable memory 2322 and/or removable memory 2324. Non-removable memory 2322 can include RAM, ROM, flash memory, a hard disk, or other well-known memory devices or technologies. Removable memory 2324 can include flash memory or a Subscriber Identity Module (SIM) card, which is well known in GSM communication systems, or other well-known memory devices or technologies, such as "smart cards." Memory 2320 can be used for storing data and/or code for running operating system 2312 and application programs 2314. Example data can include web pages, text, images, sound files, video data, or other data to be sent to and/or received from one or more network servers or other devices via one or more wired or wireless networks. Memory 2320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 2320. These programs include operating system 2312, one or more application programs 2314, and other program modules and program data. Examples of such application programs or program modules may include, for example, computer program logic (e.g., computer program code or instructions) for implementing, atomic deployment manager 102, host server 104, atomic deployment manager 102, end user client 204, distribution host 206, a developer client 210, OS 304, UI 306, main application(s) 308, related optional applications 310, atomic deployment manager 312, end user client 1802, process 1804, optional package change listener 1806, distribution host 1816, in-use handler 1818, UI component 1904, version determiner 1906, atomic set generator 1908, bundler 1910, SDK 1912, flowchart 600, flowchart 700 flowchart 900, flowchart 1000, flowchart 1100, flowchart 1200, flowchart 1400, flowchart 1500, flowchart 1600, flowchart 1700, flowchart 2000 (including any suitable step of flowcharts 600, 700, 900, 1000, 1100, 1200, 1400, 1500, 1600, 1700, and 2000), and/or further examples described herein.

Mobile device 2302 can support one or more input devices 2330, such as a touch screen 2332, a microphone 2334, a camera 2336, a physical keyboard 2338 and/or a trackball 2340 and one or more output devices 2350, such as a speaker 2352 and a display 2354. Other possible output devices (not shown) can include piezoelectric or other haptic output devices. Some devices can serve more than one input/output function. For example, touch screen 2332 and display 2354 can be combined in a single input/output device. Input devices 2330 can include a Natural User Interface (NUI).

Wireless modem(s) 2360 can be coupled to antenna(s) (not shown) and can support two-way communications between processor 2310 and external devices, as is well understood in the art. Modem(s) 2360 are shown generically and can include a cellular modem 2366 for communicating with the mobile communication network 2304 and/or other radio-based modems (e.g., Bluetooth 2364 and/or Wi-Fi 1662). At least one of wireless modem(s) 2360 is typically configured for communication with one or more cellular networks, such as a GSM network for data and voice communications within a single cellular network, between cellular networks, or between the mobile device and a public switched telephone network (PSTN).

Mobile device 2302 can further include at least one input/output port 2380, a power supply 2382, a satellite navigation system receiver 2384, such as a Global Positioning System (GPS) receiver, an accelerometer 2386, and/or a physical connector 2390, which can be a USB port, IEEE 1394 (FireWire) port, and/or RS-232 port. The illustrated components of mobile device 2302 are not required or all-inclusive, as any components can be deleted and other components can be added as would be recognized by one skilled in the art.

In an example, mobile device 2302 is configured to implement any of the above-described features of flowcharts herein. Computer program logic for performing any of the operations, steps, and/or functions described herein may be stored in memory 2320 and executed by processor 2310.

IV. Example Processor-Based Computer System Implementation

Figure 24:
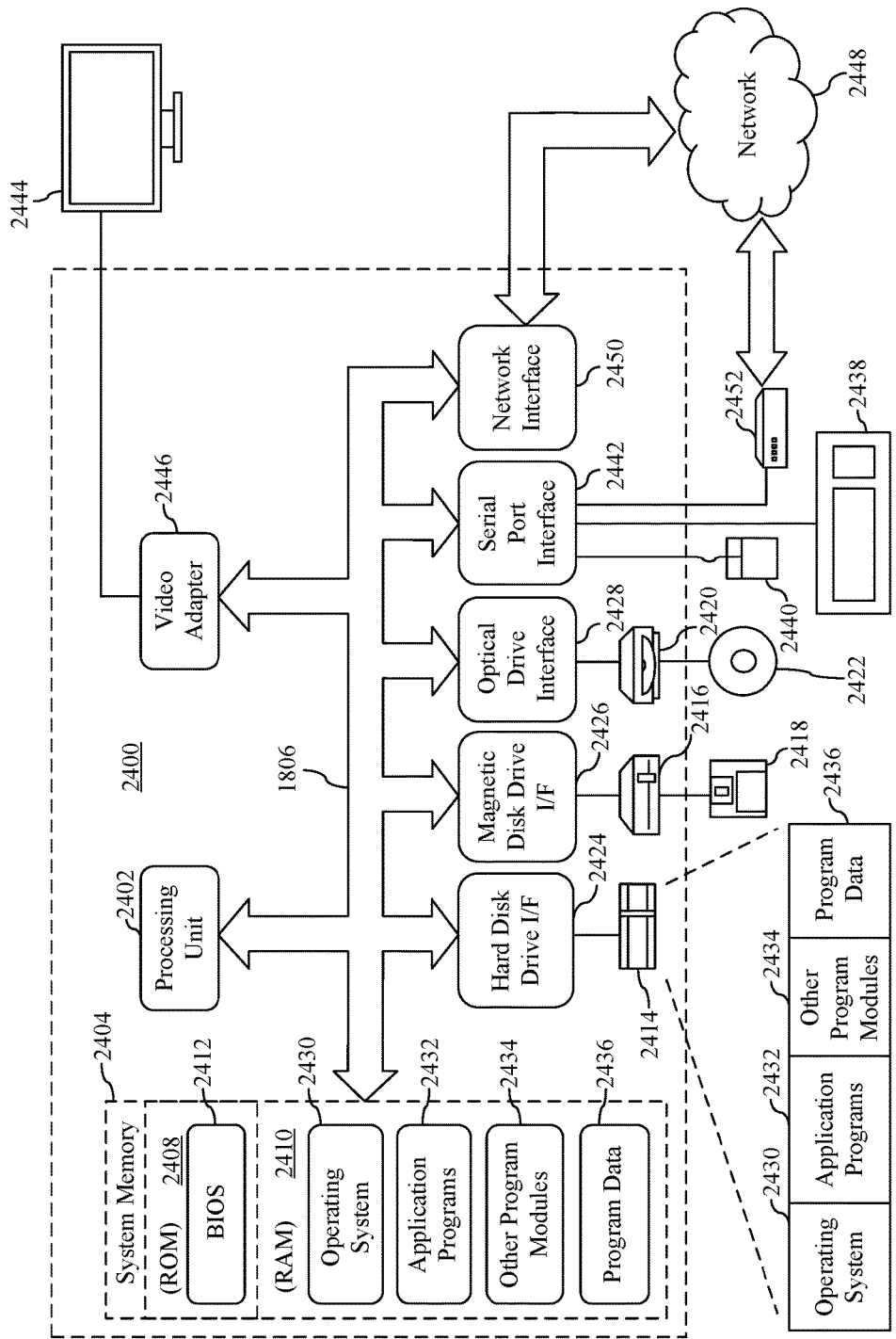
FIG. 24 shows a block diagram of an example processor-based computer system that may be used to implement various examples.

FIG. 24 depicts an example processor-based computer system 2400 that may be used to implement various examples described herein. For example, system 2400 may be used to implement any server, host, online store, system, client, device, etc., as described herein. System 2400 may also be used to implement any of the steps of any of the flowcharts, as described herein. The description of system 2400 provided herein is provided for purposes of illustration, and is not intended to be limiting. Examples may be implemented in further types of computer systems, as would be known to persons skilled in the relevant art(s).

As shown in FIG. 24, system 2400 includes a processing unit 2402, a system memory 2404, and a bus 2406 that couples various system components including system memory 2404 to processing unit 2402. Processing unit 2402 may comprise one or more circuits, microprocessors or microprocessor cores. Bus 2406 represents one or more of any of several types of bus structures, including a memory bus or memory controller, a peripheral bus, an accelerated graphics port, and a processor or local bus using any of a variety of bus architectures. System memory 2404 includes read only memory (ROM) 2408 and random access memory (RAM) 2410. A basic input/output system 2412 (BIOS) is stored in ROM 2408.

System 2400 also has one or more of the following drives: a hard disk drive 2414 for reading from and writing to a hard disk, a magnetic disk drive 2416 for reading from or writing to a removable magnetic disk 2418, and an optical disk drive 2420 for reading from or writing to a removable optical disk 2422 such as a CD ROM, DVD ROM, BLU-RAY™ disk or other optical media. Hard disk drive 2414, magnetic disk drive 2416, and optical disk drive 2420 are connected to bus 2406 by a hard disk drive interface 2424, a magnetic disk drive interface 2426, and an optical drive interface 2428, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 2430, one or more application programs 2432, other program modules 2434, and program data 2436. In accordance with various examples, the program modules may include computer program logic that is executable by processing unit 2402 to perform any or all of the functions and features of any technique or example described herein, including the computer program logic described above with regard to FIG. 23. The program modules may also include computer program logic that, when executed by processing unit 2402, causes processing unit 2402 to perform any of the steps of any of the flowcharts, as described above.

A user may enter commands and information into system 2400 through input devices such as a keyboard 2438 and a pointing device 2440 (e.g., a mouse). Other input devices (not shown) may include a microphone, joystick, game controller, scanner, or the like. In one example, a touch screen is provided in conjunction with a display 2444 to allow a user to provide user input via the application of a touch (as by a finger or stylus for example) to one or more points on the touch screen. These and other input devices are often connected to processing unit 2402 through a serial port interface 2442 that is coupled to bus 2406, but may be connected by other interfaces, such as a parallel port, game port, or a universal serial bus (USB). Such interfaces may be wired or wireless interfaces.

Display 2444 is connected to bus 2406 via an interface, such as a video adapter 2446. In addition to display 2444, system 2400 may include other peripheral output devices (not shown) such as speakers and printers.

System 2400 is connected to a network 2448 (e.g., a local area network or wide area network such as the Internet) through a network interface 2450, a modem 2452, or other suitable means for establishing communications over the network. Modem 2452, which may be internal or external, is connected to bus 2406 via serial port interface 2442.

As used herein, the terms "computer program medium," "computer-readable medium," and/or "computer-readable storage medium" are used to generally refer to memory devices or storage structures such as the hard disk associated with hard disk drive 2414, removable magnetic disk 2418, removable optical disk 2422, as well as other memory devices or storage structures such as flash memory cards, digital video disks, random access memories (RAMs), read only memories (ROM), and the like. Such computer-readable storage media are distinguished from and non-overlapping with communication media, software programs, and transitory signals (do not include communication media, software programs, or transitory signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Examples are also directed to such communication media.

As noted above, computer programs and modules (including application programs 2432 and other program modules 2434) may be stored on the hard disk, magnetic disk, optical disk, ROM, or RAM. Such computer programs may also be received via network interface 2450, serial port interface 2442, or any other interface type. Such computer programs, when executed or loaded by an application, enable system 1700 to implement features of examples discussed herein. Accordingly, such computer programs represent controllers of the system 2400. Examples are also directed to computer program products comprising software stored on any computer useable medium. Such software, when executed in one or more data processing devices, causes a data processing device(s) to operate as described herein. Examples may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

V. Additional Examples

In examples, one or more of the steps or operations of any flowchart described herein may not be performed. Moreover, steps or operations in addition to or in lieu of those in any flowchart described herein may be performed. Further, in examples, one or more operations of any flowchart described herein may be performed out of order, in an alternate sequence, or partially (or completely) concurrently with each other or with other operations.

The further examples described in this section may be applicable to examples disclosed in any other section or subsection of this disclosure.

A method implemented in a client device is described herein. The method includes providing a request to a host server for atomic set information associated with a first software package, the atomic set information defining version dependencies between the first software package and a related optional software package, and receiving the atomic set information from the host server. The method also includes determining a version of the software package available at the host server based on the atomic set information, and retrieving the version of the first software package from the host server.

In examples, the method specifies that the atomic set information comprises a version value of the first software package that is a main software package and a version value of the related optional software package available at the host server, and that said retrieving includes retrieving the main software package and the related optional software package. In an example, the method comprises assigning the atomic set information to the main software package at the client device, and installing the main software package and the related optional software package.

In an example, the method comprises determining that one of the main software package and the related optional software package failed to install properly subsequent to the retrieving, rolling back to previously installed versions for the main software package and for the related optional software package that correspond to a previous atomic set, and assigning the previous atomic set information to the first software package at the client device.

In examples, the method specifies that the related optional software package has a developer entity that is different from the first software package.

In examples, the method specifies that the atomic set information comprises a version value of the first software package that is a main software package and a version value of the related optional software package available at the host server, and that said retrieving includes retrieving the main software package and excludes retrieving the related optional software package that is available at the host server. In an example, the method comprises installing the main software package at the client device, and assigning the atomic set information to an installed application corresponding to the main software package at the client device.

In an example, the method comprises retrieving an additional related optional software package from the host server subsequent to retrieving the version of the first software package, receiving the atomic set information from the host server that has been updated to define version dependencies between the first software package, the related optional software package, and the additional related optional software package, retrieving an updated version of the first software package corresponding to the updated atomic set information, and installing the updated version of the first software package and the additional related optional software package at the client device.

In an example, the method comprises retrieving an additional related optional software package from the host server, the additional related optional software package comprising content that may be utilized by the first software package and by another software package, associating the additional related optional software package with the first software package, and assigning a version of the additional related optional software package to the atomic set information of the first software package. In an example, the method specifies that the version of the additional related optional software package is exclusive of atomic set information of the other software package.

In examples, the method specifies that the first software package is a gaming application, and that the related optional software package is one or more of purchased downloadable content, media or multimedia content, and add-on software content for the gaming application.

A computer-readable storage device having program instructions recorded thereon that, when executed by one or more processors, cause the one or more processors to perform a method in a client device is also described herein. The method includes providing a request to a host server for atomic set information associated with a first software package, the atomic set information defining version dependencies between the first software package, a first related optional software package, and a second related optional software package that is a software library file, and receiving the atomic set information from the host server. The method also includes determining versions available at the host server for the first software package, the first related optional software package, and the second related optional software package based on the atomic set information, retrieving the versions of the first software package from the host server, the first related optional software package, and the second related optional software package, and installing the versions of the first software package from the host server, the first related optional software package, and the second related optional software package at the client device.

In examples, the method specifies that the second related optional software package is shared between the first software package and the first related optional software package, and that each of the first software package, the first related optional software package, and the second related optional software package are required to be updated at the client device according to the atomic set information when any of the first software package, the first related optional software package, and the second related optional software package are updated.

In an example, the method comprises initiating an update for the first software package, the first related optional software package, and the second related optional software package based on the atomic set information, determining that one of the first software package, the first related optional software package, and the second related optional software package failed to update properly, and rolling back to previously installed versions for the first software package, the first related optional software package, and the second related optional software package that correspond to a previous atomic set.

In examples, the method specifies that the second related optional software package is shared between the first related optional software package and a third related optional software package that is installed at the client device and that includes version information thereof in the atomic set information, and that each of the first software package, the first related optional software package, the second related optional software package, and the third related optional software package are required to be updated at the client device according to the atomic set information when any of the first software package, the first related optional software package, the second related optional software package, and the third related optional software package are updated.

In an example, the method comprises retrieving a third related optional software package from the host server subsequent to retrieving the version of the first software package, receiving updated atomic set information that includes a version of the third related optional software package and an updated version of the first software package from the host server, and installing the updated version of the first software package and third related optional software package at the client device.

In examples, the method specifies that the first software package comprises a main software package of a software program suite, the first and the third related optional software package comprise software sub-packages of the main software package, and the second related optional software package is a dynamic linked library file.

In an example, the method comprises dynamically updating one or more of the first related optional software package and the second related optional software package while a main package process corresponding to the installed version of the main package is executing at the client device.

A system is also described herein. The system comprises at least one memory configured to store program instructions, and at least one processor configured to execute the program instructions. The program instructions include user interface (UI) instructions for providing a UI configured to receive a set of program components from an application developer entity, the set of program components comprising one or more of a main software package and an optional software package, and a version value for each software package in the set of program components. The program instructions also include determination instructions for determining each of the version values, atomic set instructions for generating an atomic set manifest based on the version values, and bundler instructions for generating a software program bundle that includes the set of program components and the atomic set manifest.

In examples, the system specifies that the program instructions comprise a software development kit.

In examples, the system specifies that the set of program components comprises the optional software package of the developer entity, and that the bundler instructions are further for generating information in the atomic set manifest that associates the set of program components with another software program bundle that includes another set of program components from a different developer entity.

In examples, the system specifies that the set of program components comprises the main software package of the developer entity and the optional software package of another developer entity.

In examples, the system specifies that the atomic set manifest comprises an extensible markup language (XML) document that defines version dependencies between program components in the set of program components requiring the program components in the set of program components to be serviced together subsequent to installation at a client device.

VI. Conclusion

While various examples of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described examples, but should be defined only in accordance with the following claims and their equivalents.

What is claimed is:

1. A method implemented in a client device, the method comprising:
   providing a request to a host server for atomic set information associated with a first software package, the atomic set information defining version dependencies between the first software package and a related optional software package, the version dependency specifying version values for the first software package and the related optional software package that are compatible for joint operations and co-installation at the client device;
   receiving the atomic set information from the host server;
   determining a version of the first software package available at the host server based on the atomic set information; and
   retrieving the version of the first software package from the host server.

2. The method implemented in the client device of claim 1, wherein the atomic set information comprises a version value of the first software package that is a main software package and a version value of the related optional software package available at the host server;
   wherein said retrieving includes retrieving the main software package and the related optional software package; and
   the method further comprising:
      assigning the atomic set information to the main software package at the client device; and
      installing the main software package and the related optional software package.

3. The method implemented in the client device of claim 2, the method further comprising:
   determining that one of the main software package and the related optional software package failed to install properly subsequent to the retrieving;
   rolling back to previously installed versions for the main software package and for the related optional software package that correspond to a previous atomic set; and
   assigning the previous atomic set information to the first software package at the client device.

4. The method implemented in the client device of claim 2, wherein the related optional software package has a developer entity that is different from the first software package.

5. The method implemented in the client device of claim 1, wherein the atomic set information comprises a version value of the first software package that is a main software package and a version value of the related optional software package available at the host server;
   wherein said retrieving includes retrieving the main software package and excludes retrieving the related optional software package that is available at the host server; and
   the method further comprising:
      installing the main software package at the client device; and
      assigning the atomic set information to an installed application corresponding to the main software package at the client device.

6. The method implemented in the client device of claim 1, further comprising:
   retrieving an additional related optional software package from the host server subsequent to retrieving the version of the first software package;
   receiving the atomic set information from the host server that has been updated to define version dependencies between the first software package, the related optional software package, and the additional related optional software package;
   retrieving an updated version of the first software package corresponding to the updated atomic set information; and
   installing the updated version of the first software package and the additional related optional software package at the client device.

7. The method implemented in the client device of claim 1, further comprising:
   retrieving an additional related optional software package from the host server, the additional related optional software package comprising content that may be utilized by the first software package and by another software package;
   associating the additional related optional software package with the first software package; and
   assigning a version of the additional related optional software package to the atomic set information of the first software package;
   wherein the version of the additional related optional software package is exclusive of atomic set information of the other software package.

8. The method implemented in the client device of claim 1, wherein the first software package is a gaming application; and
   wherein the related optional software package is one or more of purchased downloadable content, media or multimedia content, and add-on software content for the gaming application.

9. A computer-readable storage device having program instructions recorded thereon that, when executed by one or more processors, cause the one or more processors to perform a method in a client device, the method comprising:
   providing a request to a host server for atomic set information associated with a first software package, the atomic set information defining version dependencies between the first software package, a first related optional software package, and a second related optional software package that is a software library file, the version dependencies specifying version values for the first software package, the first related optional software package, and the second related optional software package that are compatible for joint operations and co-installation at the client device;
   receiving the atomic set information from the host server;
   determining a version available at the host server for each of the first software package, the first related optional software package, and the second related optional software package based on the atomic set information;
   retrieving the versions of the first software package, the first related optional software package, and the second related optional software package from the host server; and
   installing the versions of the first software package, the first related optional software package, and the second related optional software package at the client device.

10. The computer-readable storage device of claim 9, wherein the second related optional software package is shared between the first software package and the first related optional software package; and
   wherein each of the first software package, the first related optional software package, and the second related optional software package are required to be updated at the client device according to the atomic set information when any of the first software package, the first related optional software package, and the second related optional software package are updated.

11. The computer-readable storage device of claim 10, wherein the method further comprises:
   initiating an update for the first software package, the first related optional software package, and the second related optional software package based on the atomic set information;
   determining that one of the first software package, the first related optional software package, and the second related optional software package failed to update properly; and
   rolling back to previously installed versions for the first software package, the first related optional software package, and the second related optional software package that correspond to a previous atomic set.

12. The computer-readable storage device of claim 9, wherein the second related optional software package is shared between the first related optional software package and a third related optional software package that is installed at the client device and that includes version information thereof in the atomic set information; and
   wherein each of the first software package, the first related optional software package, the second related optional software package, and the third related optional software package are required to be updated at the client device according to the atomic set information when any of the first software package, the first related optional software package, the second related optional software package, and the third related optional software package are updated.

13. The computer-readable storage device of claim 9, wherein the method further comprises:
   retrieving a third related optional software package from the host server subsequent to retrieving the version of the first software package;
   receiving updated atomic set information that includes a version of the third related optional software package and an updated version of the first software package from the host server; and
   installing the updated version of the first software package and third related optional software package at the client device.

14. The computer-readable storage device of claim 9, wherein the first software package comprises a main software package of a software program suite, the first and the third related optional software package comprise software sub-packages of the main software package, and the second related optional software package is a dynamic linked library file.

15. The computer-readable storage device of claim 9, wherein the method further comprises:
- dynamically updating one or more of the first related optional software package and the second related optional software package while a main package process corresponding to the installed version of the main package is executing at the client device.

16. A system comprising:
- at least one memory configured to store program instructions;
- at least one processor configured to execute the program instructions, the program instructions including:
  - user interface (UI) instructions for providing a UI configured to receive a set of program components from an application developer entity, the set of program components comprising:
    - one or more of a main software package and an optional software package, and
    - a version value for each software package in the set of program components;
  - determination instructions for determining each of the version values;
  - atomic set instructions for generating an atomic set manifest based on the version values, the atomic set manifest including version dependencies for the main software package and the optional software package that specifies ones of the version values for the first software package and the related optional software package that are compatible for joint operations and co-installation at the client device; and
  - bundler instructions for generating a software program bundle that includes the set of program components and the atomic set manifest.

17. The system of claim 16, wherein the program instructions comprise a software development kit.

18. The system of claim 16, wherein the set of program components comprises the optional software package of the developer entity; and
- wherein the bundler instructions are further for generating information in the atomic set manifest that associates the set of program components with another software program bundle that includes another set of program components from a different developer entity.

19. The system of claim 16, wherein the set of program components comprises the main software package of the developer entity and the optional software package of another developer entity.

20. The system of claim 16, wherein the atomic set manifest comprises an extensible markup language (XML) document that defines version dependencies between program components in the set of program components requiring the program components in the set of program components to be serviced together subsequent to installation at a client device.

* * * * *